(12) United States Patent
Laufer et al.

(10) Patent No.: US 12,256,346 B2
(45) Date of Patent: Mar. 18, 2025

(54) ENVELOPE TRACKING FOR WIDEBAND SIGNALS USING FILTER BANK PROCESSING

(71) Applicant: QUALCOMM Incorporated, San Diego, CA (US)

(72) Inventors: Yaron Laufer, Brookline, MA (US); Gideon Shlomo Kutz, Ramat Hasharon (IL); Assaf Touboul, Netanya (IL); Tal Oved, Modiin (IL); Elad Meir, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/532,277

(22) Filed: Dec. 7, 2023

(65) Prior Publication Data

US 2024/0155518 A1    May 9, 2024

Related U.S. Application Data

(63) Continuation of application No. 17/453,800, filed on Nov. 5, 2021, now Pat. No. 12,069,594.

(51) Int. Cl.
H04W 52/52     (2009.01)
H04W 24/08     (2009.01)

(52) U.S. Cl.
CPC ........... H04W 52/52 (2013.01); H04W 24/08 (2013.01)

(58) Field of Classification Search
CPC .................................................. H04W 52/52
See application file for complete search history.

(56) References Cited

U.S. PATENT DOCUMENTS

| | | | |
|---|---|---|---|
| 8,913,692 | B1 | 12/2014 | Copeland |
| 2014/0073273 | A1 | 3/2014 | Asensio et al. |
| 2015/0195118 | A1 | 7/2015 | Yan et al. |
| 2015/0280674 | A1 | 10/2015 | Langer et al. |
| 2023/0143623 | A1 | 5/2023 | Laufer |

*Primary Examiner* — Hsinchun Liao
(74) *Attorney, Agent, or Firm* — Patterson + Sheridan, L.L.P.

(57) ABSTRACT

Certain aspects of the present disclosure provide techniques for envelope tracking schemes for a node in a wireless communication network. One aspect provides a method for wireless communication by a transmitter device. The method generally includes: combining envelopes associated with subbands of an input signal to be amplified for transmission based on a combination function; amplifying, via an amplifier, the input signal to generate a transmission signal, the input signal being amplified based on a combined envelope signal, representing the combination of the envelopes, received at a supply input of the amplifier; and transmitting the transmission signal to a receiver device.

24 Claims, 20 Drawing Sheets

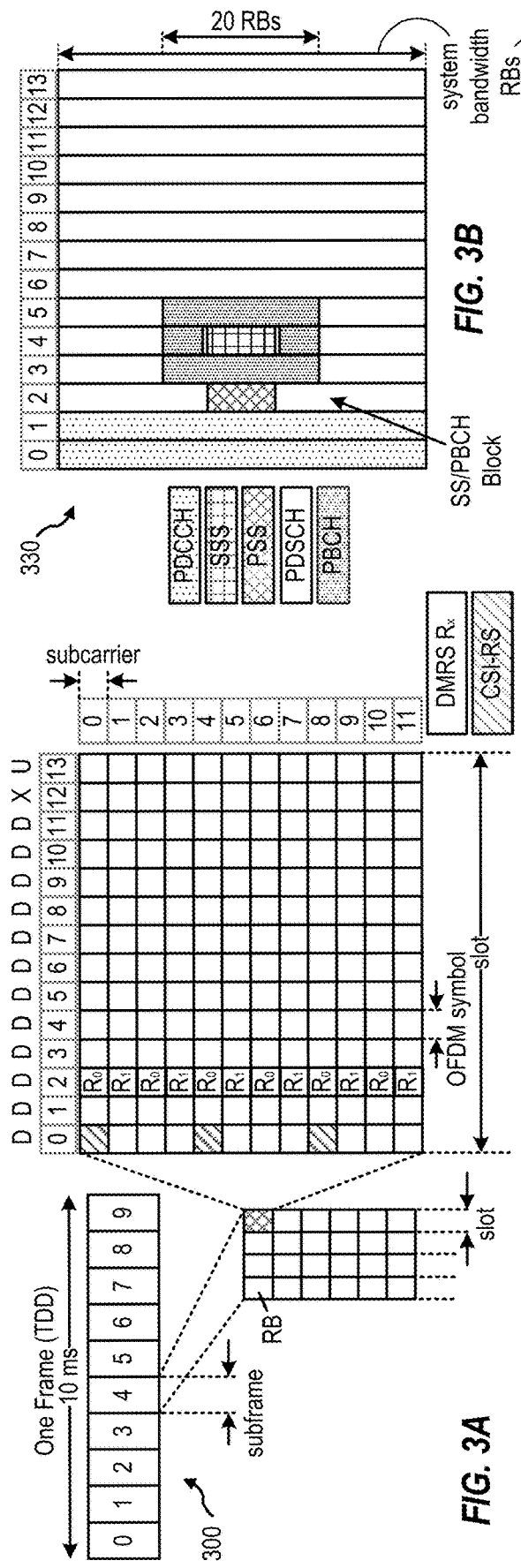
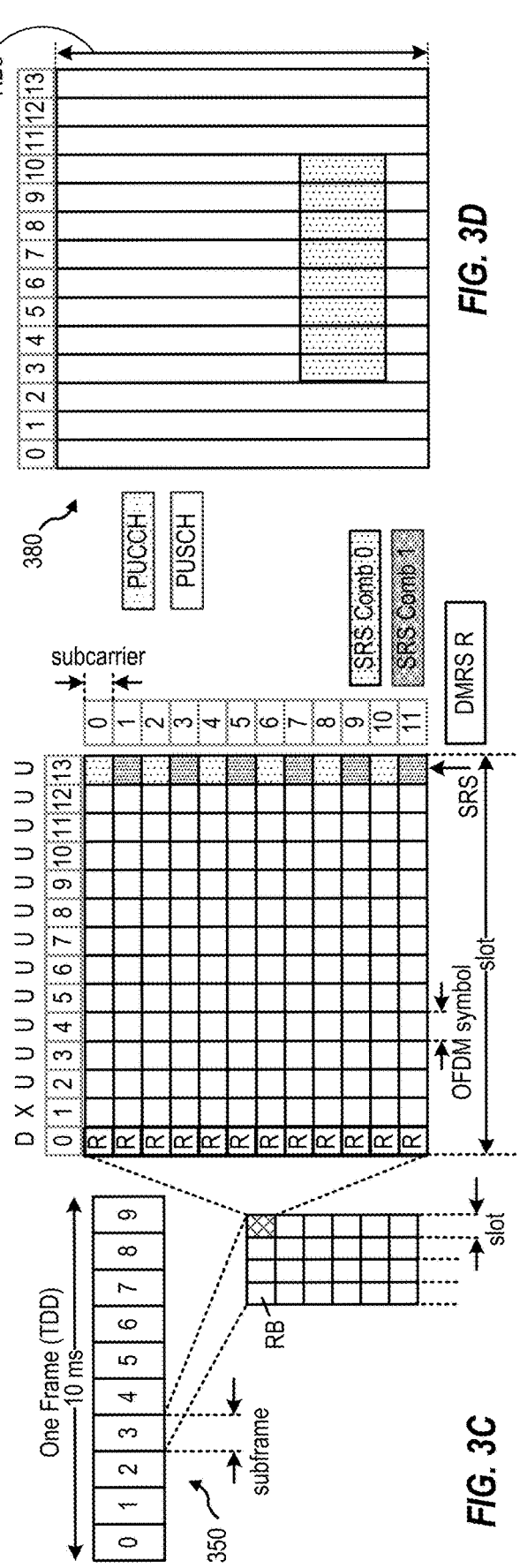

ENVELOPE TRACKING FOR WIDEBAND SIGNALS USING FILTER BANK PROCESSING

CLAIM OF PRIORITY UNDER 35 U.S.C. § 119

This application is a continuation of U.S. patent application Ser. No. 17/453,800, filed Nov. 5, 2021, which is herein incorporated by reference in its entirety.

INTRODUCTION

Aspects of the present disclosure relate to wireless communications systems and, more particularly, to envelope tracking schemes for a node in a wireless communication network.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a transmitter device. The method generally includes: combining envelopes associated with subbands of an input signal to be amplified for transmission based on a combination function; receiving, at a supply input of an amplifier, a combined envelope signal representing the combination of the envelopes; amplifying, via the amplifier, the input signal to generate a transmission signal, the input signal being amplified based on the combined envelope signal; and transmitting the transmission signal to a receiver device.

One aspect provides a method for wireless communication by a receiver device. The method generally includes: receiving, from a transmitter device, a transmission signal generated using envelope tracking via an amplification system at the transmitter device, the envelope tracking being based on combined envelopes associated with subbands of an input signal when amplifying the input signal; and reducing distortion associated with the transmission signal based on a characteristic of the amplification system.

One aspect provides a method for wireless communication by a transmitter device. The method generally includes: transmitting an indication of a characteristic of an amplification system used to amplify an input signal for transmission, wherein the amplification system implements envelope tracking using a combination of envelopes associated with subbands of the input signal; and transmitting, to a receiver device, a transmission signal by amplifying the input signal using the amplification system.

One aspect provides a method for wireless communication by a receiver device. The method generally includes: receiving, from a transmitter device, an indication of a characteristic of an amplification system used to amplify an input signal for transmission of a transmission signal to the receiver device, wherein the amplification system implements envelope tracking using a combination of envelopes associated with subbands of the input signal; and receiving the transmission signal based on the indication of the characteristic.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for envelope tracking and digital post distortion correction. Amplifiers may be used in a variety of systems to increase the power of an input signal, such as in wireless communication systems utilizing radio frequency (RF) signals. For example, amplifiers may be used in wireless communication systems to increase the power of an RF signal for transmission, or increase the power of a received RF signal. RF front ends in such systems may implement envelope tracking, which is an approach to amplifier design where the power supply voltage to the amplifier is adjusted to track the instant transmission power demanded for transmitting a dynamic signal. Accordingly, the amplifier may operate efficiently according to the varying power level. However, performing envelope tracking involves tracking the envelope of an input signal in real time, which is difficult when the input signal has a wide bandwidth. Therefore, implementation of envelope tracking may be bandwidth limited.

In some aspects, an envelope of an input signal may be derived using a combination of envelopes associated with subbands of the input signal. The derived envelope is then provided as a supply voltage to an amplifier used to amplify the input signal to facilitate a reduction in power consumption. Determining the envelope using the combination of subband envelopes extends the usage of envelope tracking to larger band signals and facilitates improvements to power efficiency for transceivers operating at larger bandwidths.

In some cases, envelope tracking using the combination of subband envelopes may result in distortions associated the signal transmission. For example, the derived envelope used for envelope tracking being less than the actual envelope of the input signal may result in distortions. In some aspects of the present disclosure, such distortions may be reduced at a receiver device based on characteristics of an amplification system used to amplify the input signal at the transmitter device. Thus, the aspects described herein facilitate envelope tracking for wideband signals for reduction of power consumption at a transmitter, and facilitate reduction of distortion at a receiver.

Introduction to Wireless Communication Networks

Figure 1:
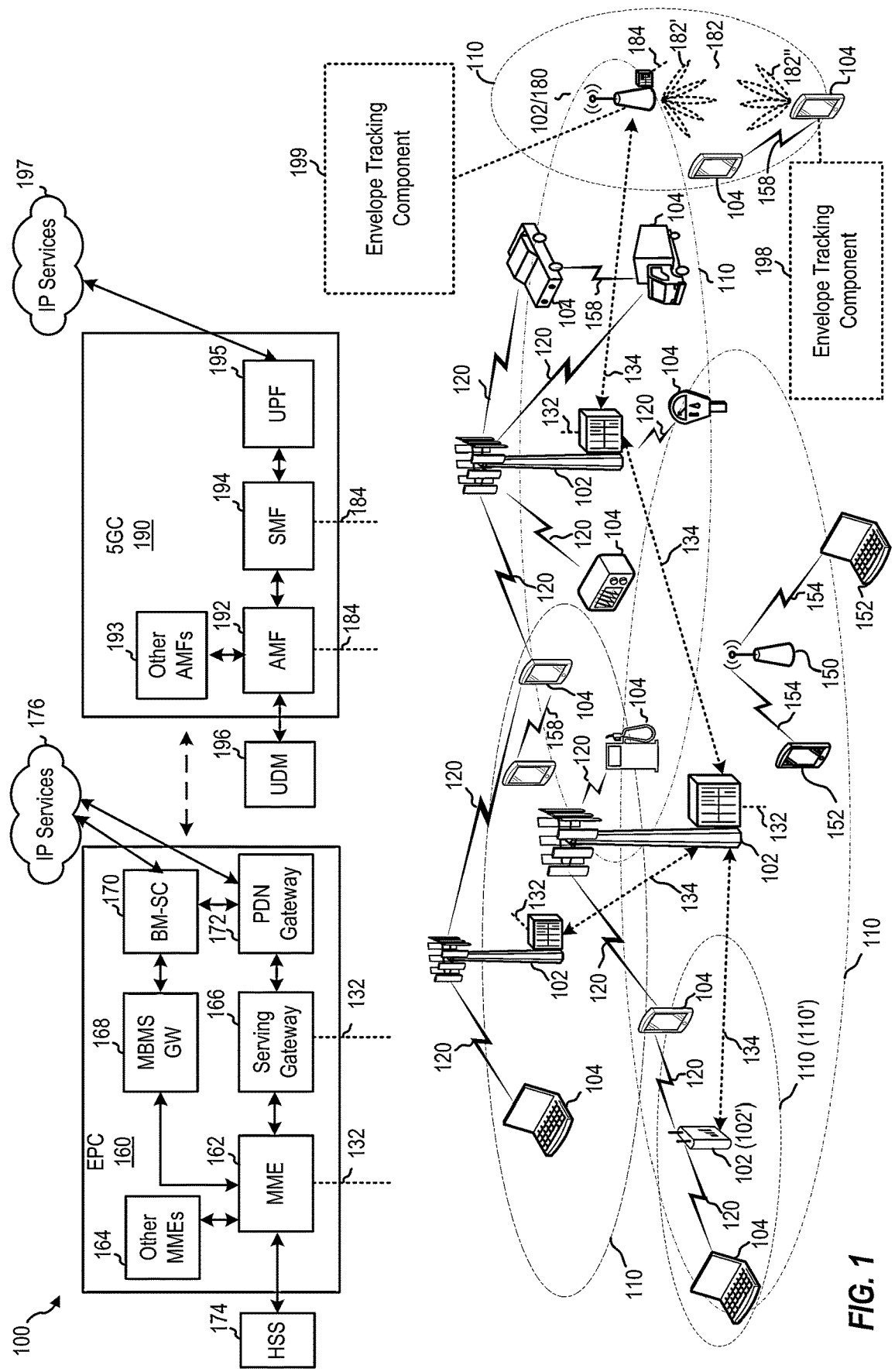
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same Similarly, the transmit and receive directions for UE 104 may or may not be the same.

Wireless communication network 100 includes envelope tracking component 199, which may be configured to perform envelope tracking for signal transmission or perform distortion reduction for received signaling. Wireless network 100 further includes envelope tracking component 198, which may be used configured to perform envelope tracking for signal transmission or perform distortion reduction for received signaling.

Figure 2:
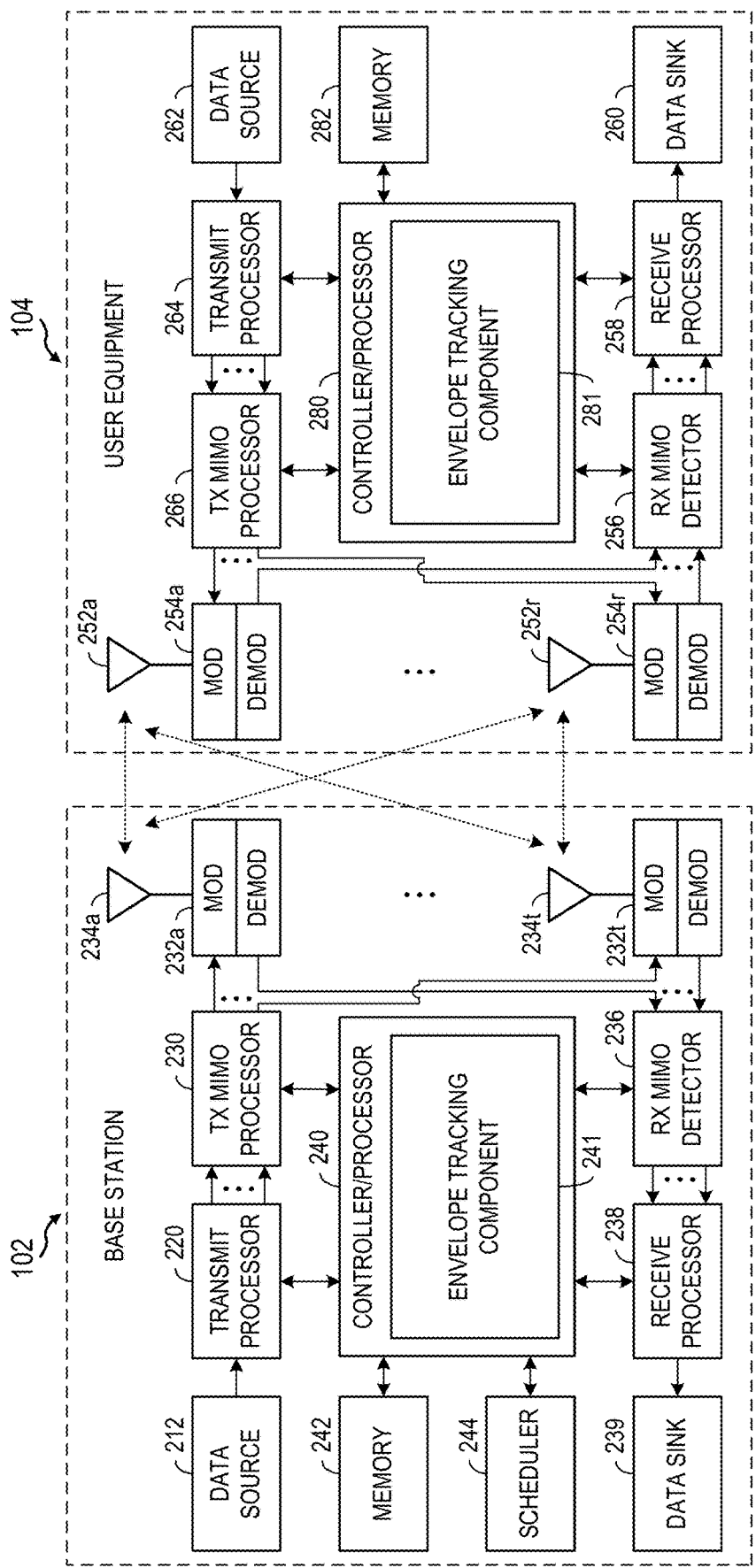
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes envelope tracking component 241, which may be representative of envelope tracking component 199 of FIG. 1. Notably, while depicted as an aspect of controller/processor 240, envelope tracking component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes envelope tracking component 281, which may be representative of envelope tracking component 198 of FIG. 1. Notably, while depicted as an aspect of controller/processor 280, envelope tracking component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Transceiver Front End

Figure 4:
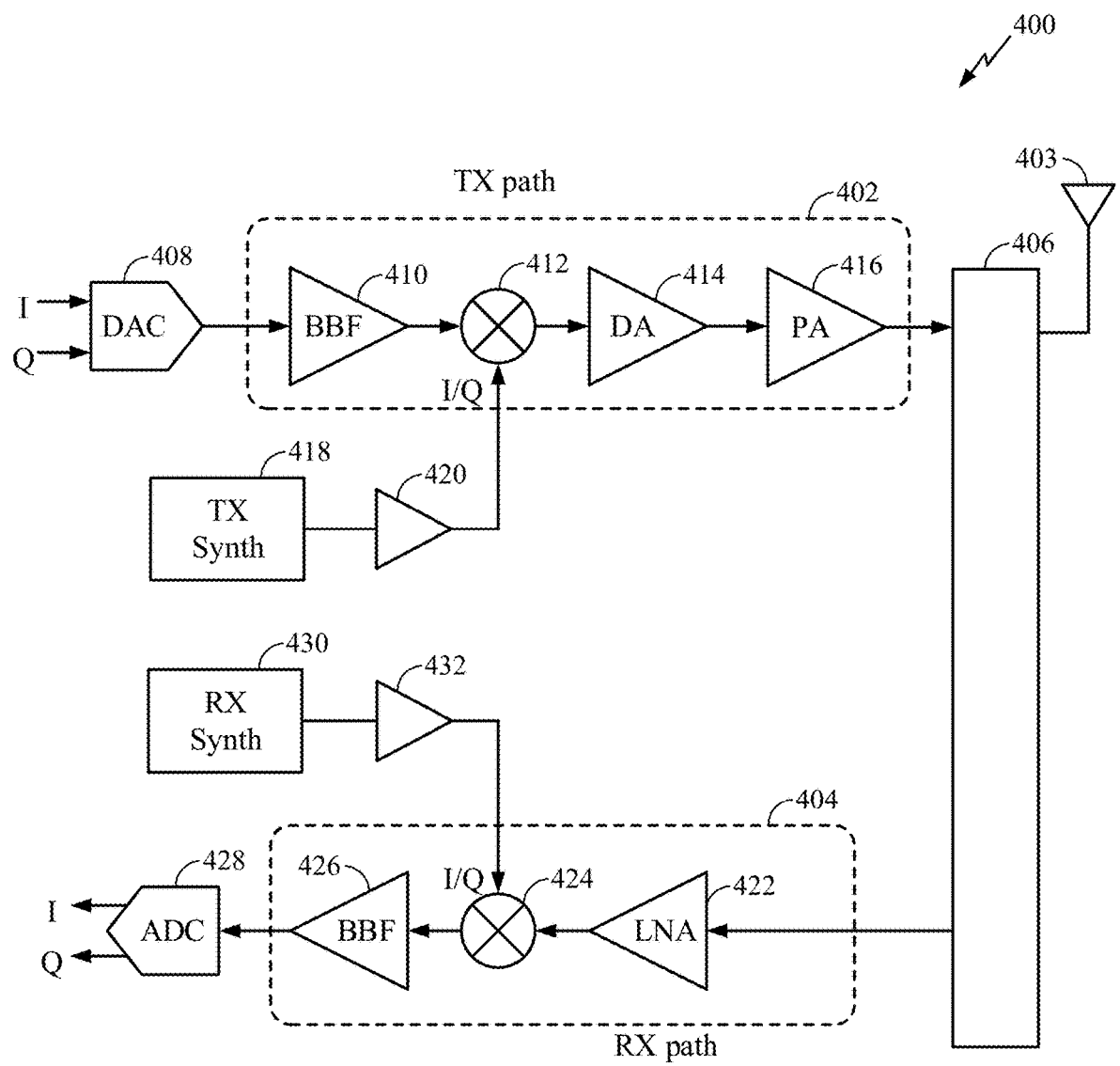
FIG. 4 is a block diagram of an example transceiver front end.

FIG. 4 is a block diagram of an example transceiver front end 400, in which aspects of the present disclosure may be practiced. The UE 104 illustrated in FIG. 1 and FIG. 2 may include multiple transmit paths 402 and/or multiple receive paths 404.

The transceiver front end 400 includes a transmit (TX) path 402 (e.g., also known as a transmit chain) for transmitting signals via one or more antennas and a receive (RX) path 404 (e.g., also known as a receive chain) for receiving signals via the antennas. When the TX path 402 and the RX path 404 share an antenna 403, the paths may be connected with the antenna via an interface 406, which may include any of various suitable RF devices, such as a duplexer, a switch, a diplexer, and the like.

Receiving in-phase (I) or quadrature (Q) baseband analog signals from a digital-to-analog converter (DAC) 408, the TX path 402 may include a baseband filter (BBF) 410, a mixer 412, a driver amplifier (DA) 414, and a power amplifier (PA) 416. The BBF 410, the mixer 412, and the DA 414 may be included in a radio frequency integrated circuit (RFIC), while the PA 416 may be external to the RFIC. The BBF 410 filters the baseband signals received from the DAC 408, and the mixer 412 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 412 are typically RF signals, which are amplified by the DA 414 and by the PA 416 before transmission by the antenna 403.

The RX path 404 includes a low noise amplifier (LNA) 422, a mixer 424, and a baseband filter (BBF) 426. The LNA 422, the mixer 424, and the BBF 426 may be included in a radio frequency integrated circuit (RFIC), which may or may not be the same RFIC that includes the TX path components. RF signals received via the antenna 403 may be amplified by the LNA 422, and the mixer 424 mixes the amplified RF signals with a receive local oscillator (LO) signal to convert the RF signal of interest to a different baseband frequency (i.e., downconvert). The baseband signals output by the mixer 424 may be filtered by the BBF 426 before being converted by an analog-to-digital converter (ADC) 428 to digital I or Q signals for digital signal processing.

While it is desirable for the output of an LO to remain stable in frequency, tuning to different frequencies indicates using a variable-frequency oscillator, which involves compromises between stability and tunability. Contemporary systems may employ frequency synthesizers with a voltage-controlled oscillator (VCO) to generate a stable, tunable LO with a particular tuning range. Thus, the transmit LO may be produced by a TX frequency synthesizer 418, whose output may be buffered or amplified by amplifier 420 before being mixed with the baseband signals in the mixer 412 Similarly, the receive LO may be produced by an RX frequency synthesizer 440, whose output may be buffered or amplified by amplifier 442 before being mixed with the RF signals in the mixer 424.

In some aspects, the power supply for the PA 416 may comprise an envelope tracking power supply. The envelope tracking power supply modulates the power supplied to the PA 416, where the voltage associated with the modulated power supply for the PA 416 tracks (or is otherwise based on) the envelope (e.g., envelope waveform) of the signal to be amplified by the PA 416, as described in more detail herein.

Figure 5:
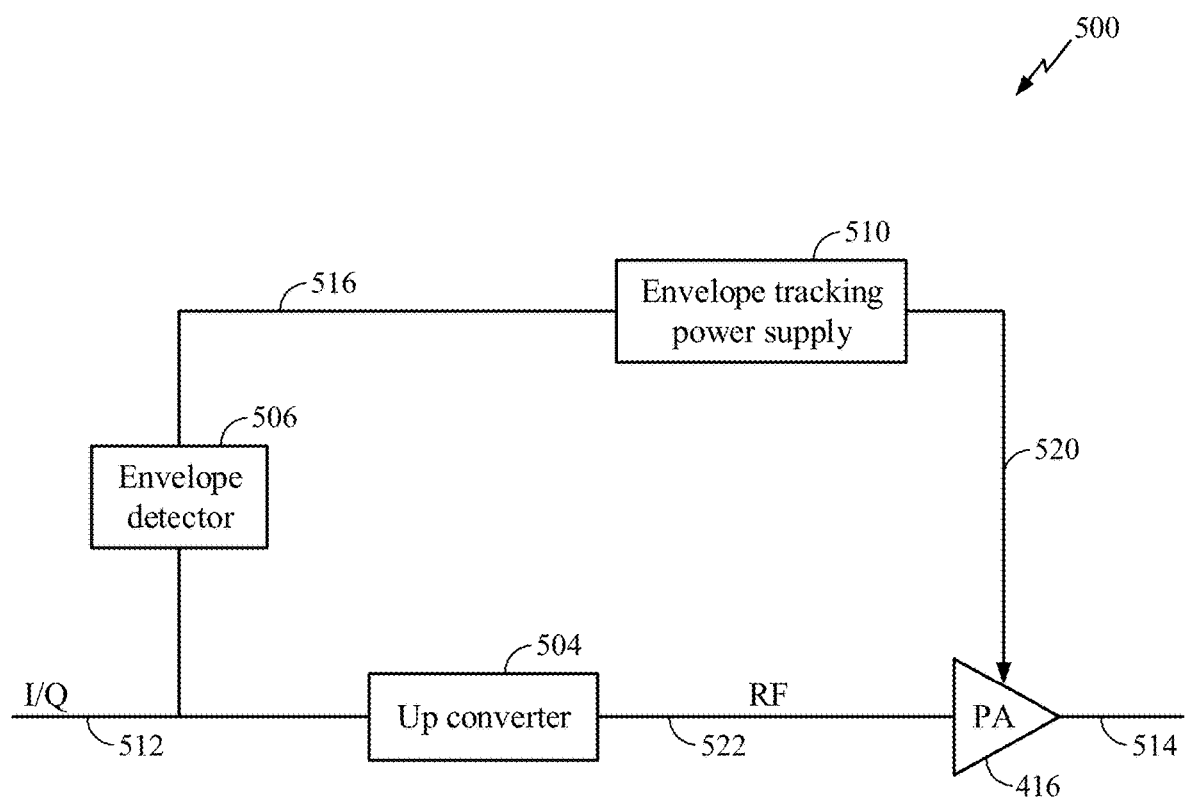
FIG. 5 illustrates an example envelope tracking amplification system.

FIG. 5 illustrates an example envelope tracking amplification system 500, in which aspects of the present disclosure may be practiced. The envelope tracking amplification system 500 may include a PA 416, an up-converter 504, an envelope detector 506, and an envelope tracking power supply 510. As illustrated, the PA 416 may be configured to amplify an input signal 512 (or a signal based on the input signal). The input signal 512 may represent an in-phase (I) and/or quadrature (Q) signal. In some cases, the input signal 512 may be upconverted to an RF input signal 522 by the up-converter 504 before being amplified by the PA 416.

The input signal 512 is also used as an input to the envelope detector 506, which generates an envelope signal representing the envelope of the input signal 512 at its output 516 (e.g., provides a signal representing the magnitude of the input signal 512). The output 516 of the envelope detector 506 provides an input to the envelope tracking power supply 510, which in dependence thereon provides a supply voltage 520 to the PA 416. In this manner, the supply voltage 520 of the PA is adjusted based on (e.g., tracks) the envelope of the input signal 512. The PA 416 amplifies the input signal 512 or the RF input signal 522 to generate an amplified output signal 514 for transmission by an antenna. The PA 416 may be implemented as a single stage or multi-stage amplifier.

Figure 6:
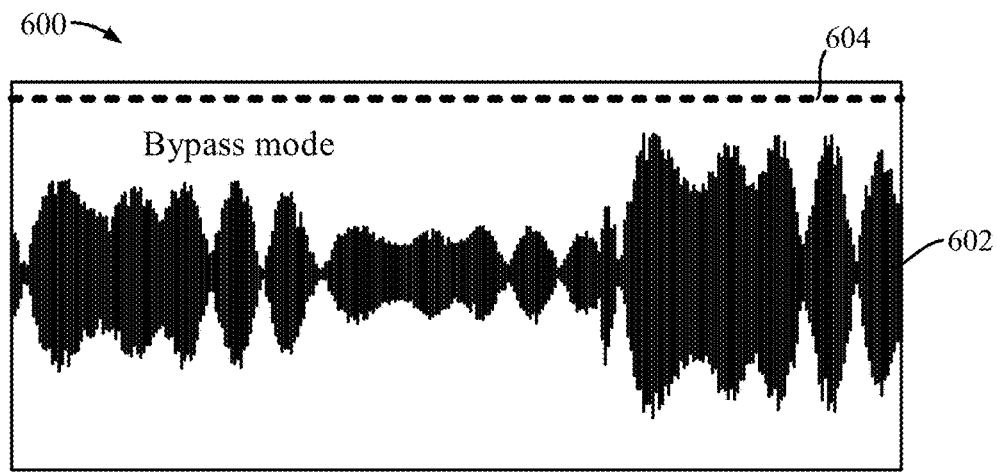
FIG. 6 illustrates an example bypass mode of operation of an amplification system.

FIG. 6 illustrates an example bypass mode of operation 600 of an amplification system. While operating in a bypass mode, the UE may not apply an efficient bias to the PA 416. For example, the battery voltage may be directly provided as a fixed power amplifier supply voltage for the PA 416 to amplify an upconverted RF signal. Since the power amplifier supply voltage is set to be greater than the signal peaks of the RF signal to be amplified to avoid clipping, the battery voltage of the UE in bypass mode may be a constant high value. As a result, excess current may be drawn by the PA 416 and dissipated as wasted energy when the PA 416 operates in a bypass mode.

Signal 602 represents the envelope of the signal to be amplified. Voltage 604 represents the supply voltage applied to the PA 416. The supply voltage 604 applied to the PA 416 may be a constant, high value (e.g., relative to the envelope of the signal to be amplified). Accordingly, a bypass mode may provide little or no reduction in the power consumed by the PA 416.

Figure 7:
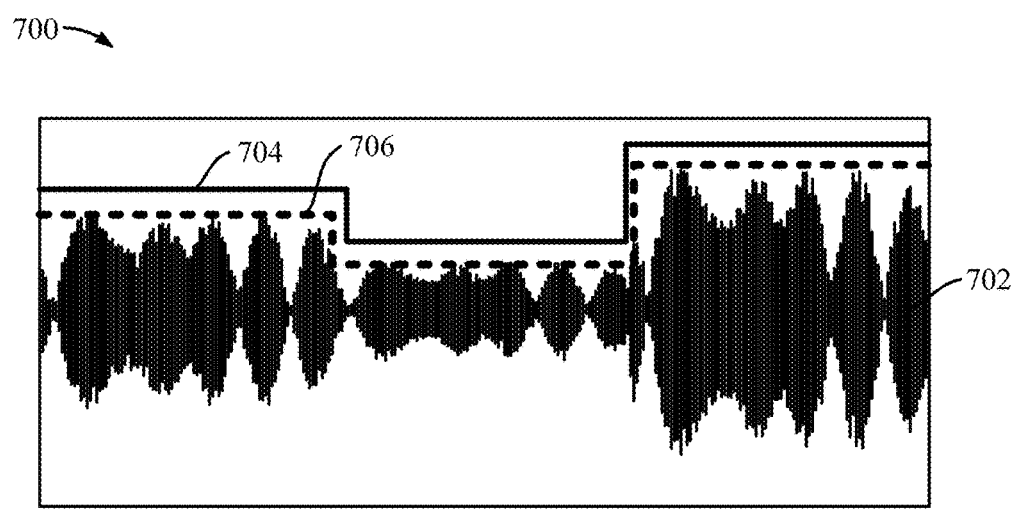
FIG. 7 illustrates an example average power tracking (APT) or enhanced power tracking (EPT) mode of operation of an amplification system.

FIG. 7 illustrates an example average power tracking (APT) or enhanced power tracking (EPT) mode of operation 700 of an amplification system. APT and EPT may reduce power consumption by the PA 416 compared to the bypass mode of operation. In the APT mode, the supply voltage to the PA 416 may be adjusted based on the average transmit power of the signal to be amplified (e.g., averaged over a period of time, such as 1 ms). In this manner, the supply voltage to the PA 416 may cause the PA 416 to operate close to a compression point, thereby improving efficiency. Signal 702 represents the envelope of the signal to be amplified. During an APT mode of operation, the PA 416 operates in a linear mode of operation, with the supply voltage 704 to the PA varying as a function of transmit power. According to aspects, the supply voltage 704 may represent the bias for the PA 416 to operate in a linear region.

The EPT mode may further reduce power consumption and increase the PA's efficiency compared to the APT mode of operation. Operations in the EPT mode may also involve adjusting the PA supply voltage based on the average transmit power of the RF signal to be amplified, similar to in APT mode; however, in the EPT mode the PA supply voltage is reduced to below the compression point of the PA. This may cause a loss of linearity at the PA and result in distortions. Such distortion may be adjusted for using digital pre-distortion. According to aspects, the supply voltage 706 may represent the bias when the UE is operating in an EPT mode. Using the supply voltage 706 may result in more conservation of power operating in an EPT mode as compared to the UE operating in an APT mode.

Figure 8:
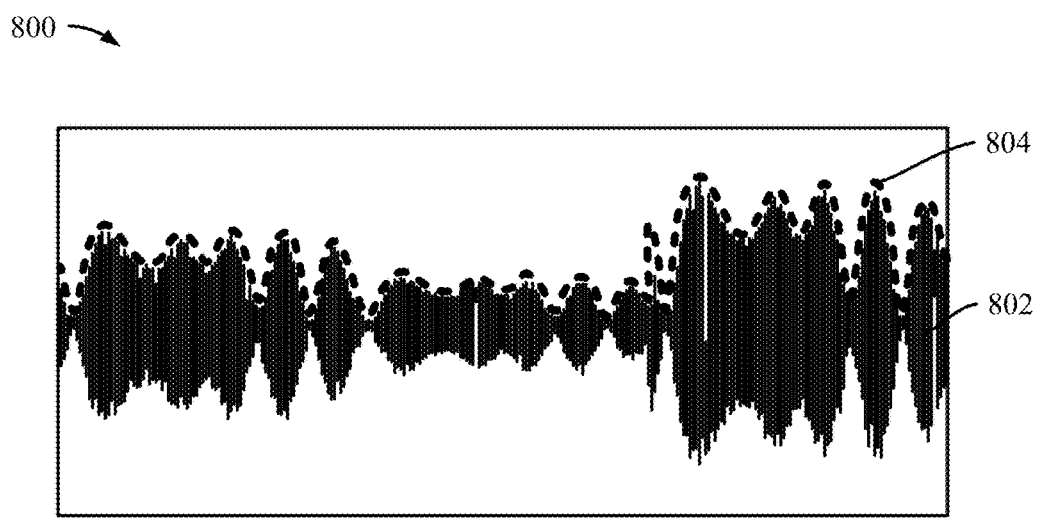
FIG. 8 illustrates an example envelope tracking mode of operation of an amplification system.

FIG. 8 illustrates an example envelope tracking (ET) mode of operation 800, according to aspects of the present disclosure. Operations in the ET mode may save more power than each of the bypass mode, APT mode, and EPT mode since in the APT mode, the supply voltage of PA 416 tracks the input signal envelope more closely than in the bypass mode, and in the EPT mode, the supply voltage of PA 416 tracks the input signal envelope more closely than in the APT mode. The ET mode may use the envelope of the signal to be amplified to control the supply voltage to the PA. Signal 802 represents the envelope of the signal to be amplified. The supply voltage 804 closely tracks the envelope of the signal 802.

Operations in the ET mode may involve converting the envelope of the signal to be amplified into an analog signal, in an effort to ensure the power amplifier supply voltage may closely track the signal to be amplified. The drawback on ET mode of operation is that ET mode is limited to small bandwidth channels due to the limited ability of envelope tracking circuitry to follow fast-changing envelopes. Certain aspects of the present disclosure use a combination of subband envelopes to implement ET, allowing for increased power savings while operating on a wider channel as compared to conventional implementations.

Aspects Related to Envelope Tracking for Signals in Downlink

Orthogonal frequency division multiple access (OFDMA) has advantages such as enabling simple channel estimation at a receiver, and providing flexibly in using available time/frequency resources. However, OFDMA comes with a cost of increased signal Peak to Average Power Ratio (PAPR) as compared to other single carrier communication techniques. Recently, higher order constellations, such as 256 quadrature amplitude modulation (QAM), 1024 QAM, or even higher, are being used. The combination of high PAPR signals and high signal quality involved with high order modulation schemes leads to poor power amplifiers utilization, resulting in high power consumption and low power efficiency.

In certain aspects, a wideband signal envelope may be approximated by a combining narrow-bandwidth envelopes (e.g., using a combination of envelopes associated with subbands of the wideband signal). The approximated wideband signal envelope may be used for envelope tracking at a transmitter device. Any residual distortion may be compensated for using digital post distortion (DPoD) correction at a receiver device. The wideband envelope may be approximated by combining narrowband envelopes obtained from a filter bank applied on the wideband signal. A function used to combine the subband envelopes may be selected to control a tradeoff between distortion and average backoff. In other words, depending on a function used to combine the subband envelopes, either greater distortion or greater power backoff may result. Power backoff refers to a maximum output power level of a PA (e.g., PA 416 of FIG. 4) being reduced so that an entirety of an input signal to be amplified is within a linear region of the PA's transfer curve. Power backoff may occur when the supply voltage to the PA is higher than the envelope of the signal to be amplified, and distortion may occur when the supply voltage to the PA is lower than the envelope of the signal to be amplified.

Using an envelope combination scheme as described (also referred to herein as filter bank ET), ET may be expanded to larger bandwidth signals, allowing for improvements to the power efficiency of a transceiver when operating at larger bandwidths. The aspects described herein are applicable for both uplink and downlink signaling. For the uplink, the aspects described herein facilitate efficiency improvements at a UE (e.g., the transmitter), with residual distortion correction being implemented at a base station (e.g., the receiver). For the downlink, the aspects described herein facilitate efficiency improvements at a base station (e.g., the transmitter), with residual distortion correction being implemented at a UE (e.g., the receiver).

Figure 9:
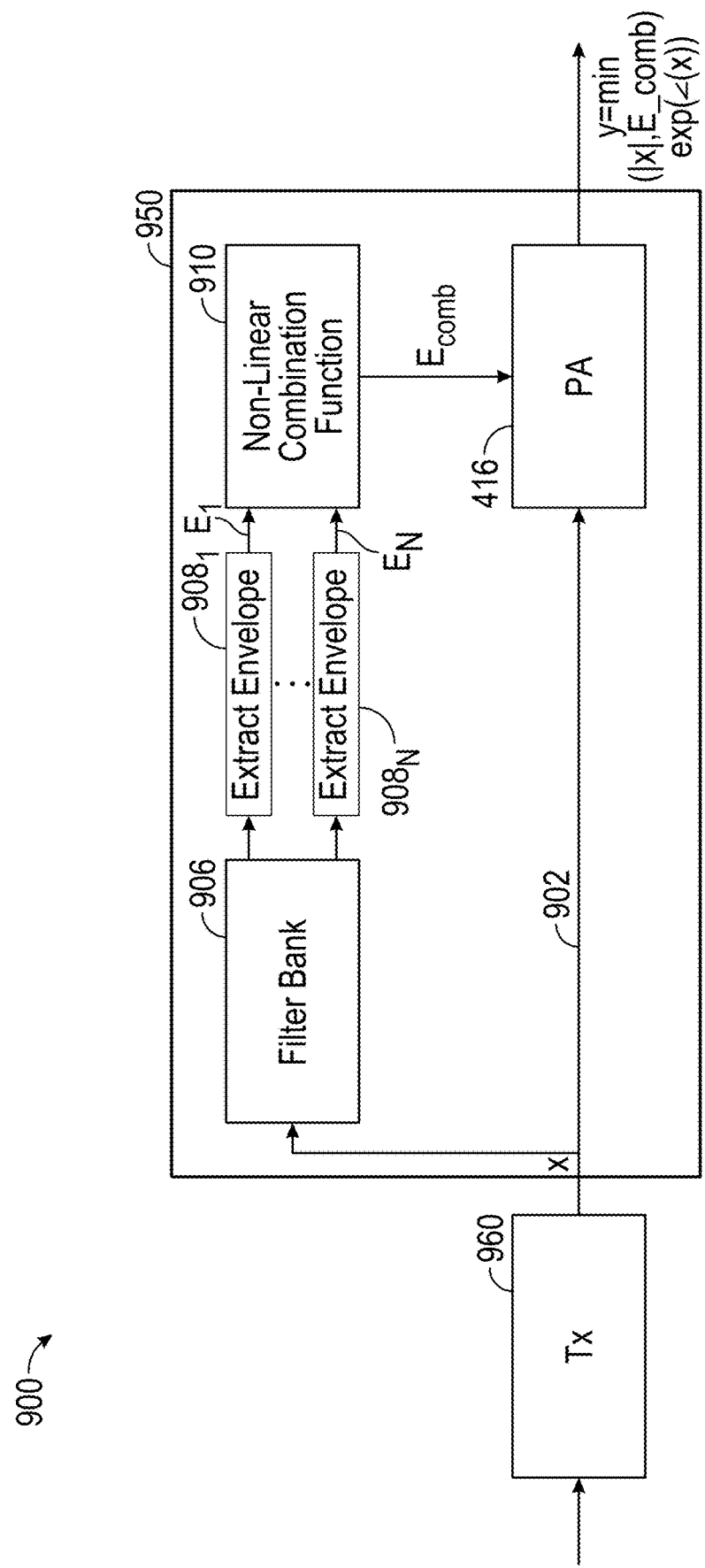
FIG. 9 illustrates an example radio frequency (RF) front end implementing filter bank envelope tracking for uplink signaling.

FIG. 9 illustrates an example radio frequency (RF) front end 900 implementing subband envelope tracking. As shown, an input signal (x) at node 902 to be amplified may be generated using a transmitter (Tx) 960. The signal at node 902 is amplified via an amplification system 950 having the PA 416. The PA 416 has a power supply voltage modulated by envelope tracking circuitry.

As the response of the envelope tracking is bandwidth limited, the wideband signal at node 902 may be filtered to multiple sub-bands to provide envelope extraction for lower bandwidth inputs to be combined, as described herein. In other words, the input signal at node 902 may be provided to a filter bank 906 having multiple subband filters (e.g., having three filters with 20 MHz passbands, where the input signal at node 902 has a 60 MHz bandwidth). Envelope detection circuits $908_1$ to $908_N$ (collectively referred to as envelope detection circuits 908) may be used to extract the envelope ($E_1$ to $E_N$) of each subband signal generated at the outputs of multiple subband filters. A nonlinear combination function 910 may be used to combine the envelopes $E_1$ to $E_N$ to achieve the desired tradeoff of distortion and backoff, as described. For example, a nonlinear function may be applied to the subband envelopes to generate a combined envelope ($E_{comb}$) used to provide an envelope tracking supply voltage to the PA 416.

Performing the envelope approximation using subband envelopes may result in the approximated envelope being greater than the actual instantaneous envelope of the signal (x) at node 902. For example, if the envelopes $E_1$ to $E_N$ are summed, the approximated envelope will likely be greater than the actual instantaneous envelope of the signal at node 902, resulting in power backoff at the PA 416. Other nonlinear combination techniques may result in the approximated envelope being lower than the actual instantaneous envelope, resulting in distortions. In some aspects, a receiver may compensate for these distortions, as described in more detail herein.

In some aspects, the PA 416 may be modeled as a hard clipper resulting in an output signal (y) of:

$$y = \min(|x|, E_{comb}) \exp(i \angle(x)),$$

where $\angle(x)$ is the angle associated with the input signal x at node 902. Clipping is a form of waveform distortion that occurs when an amplifier is overdriven and attempts to deliver an output voltage or current beyond its maximum capability (e.g., when the signal x is greater than $E_{comb}$.

In some aspects, the nonlinear combination function may take the following form:

$$E_{comb}(t) = \sum_{i=1}^{n} \alpha_i f_i(\{E_j(t)\}_{j=1}^{n}),$$

where $\alpha_i$ are coefficients, $\{E_j(t)\}$ are the narrowband (subband) envelopes obtained by the filter bank 906 and envelope detection circuits 908, and $f_i(\cdot)$ is a function of the narrowband envelopes. For instance, by choosing:

$$\alpha_i = \begin{cases} 1 & i=1 \\ 0 & \text{else} \end{cases} \text{ and } f_i = \begin{cases} \max & i=1 \\ 0 & \text{else} \end{cases}$$

the maximum envelope is obtained where:

$$E_{comb}(t) = \max\{E_j(t)\}_{j=1}^{n}$$

The combination function may also be a linear weighted sum where:

$$E_{comb}(t) = \sum_{i=1}^{n} \alpha_i E_i(t).$$

For instance, the sum envelope:

$$E_{comb}(t) = \sum_{i=1}^{n} E_i(t)$$

may be obtained by choosing $\alpha_i = 1$, $i=1, \ldots, n$. This choice yields little to no distortion but results in high backoff. In some cases, a single subband may be chosen where:

$$\alpha_i = \begin{cases} 1 & i=1 \\ 0 & \text{else} \end{cases}.$$

Using a single band yields a large distortion but no positive backoff.

As an example, when a single band combination function is used, the distortion (e.g., transmitter error vector magnitude (EVM)) may be −11 dB and the backoff may be at −2.47 dB, whereas when a maximum combination function is used, the distortion may be −17.3 dB and the backoff may be 1.34 dB. As another example, when a sum combination function is used, the distortion may be −52.3 dB (effectively little to no distortion) and the backoff may be 2.43 dB. The backoff refers to the backoff as compared to an ideal ET using a full bandwidth envelope (e.g., instead of using a combination of subband envelopes). In other words, a 2.43 dB backoff refers to a power backoff of 2.43 dB greater than a backoff associated with a power amplifier operated using ET based on a full bandwidth envelope.

Figure 10:
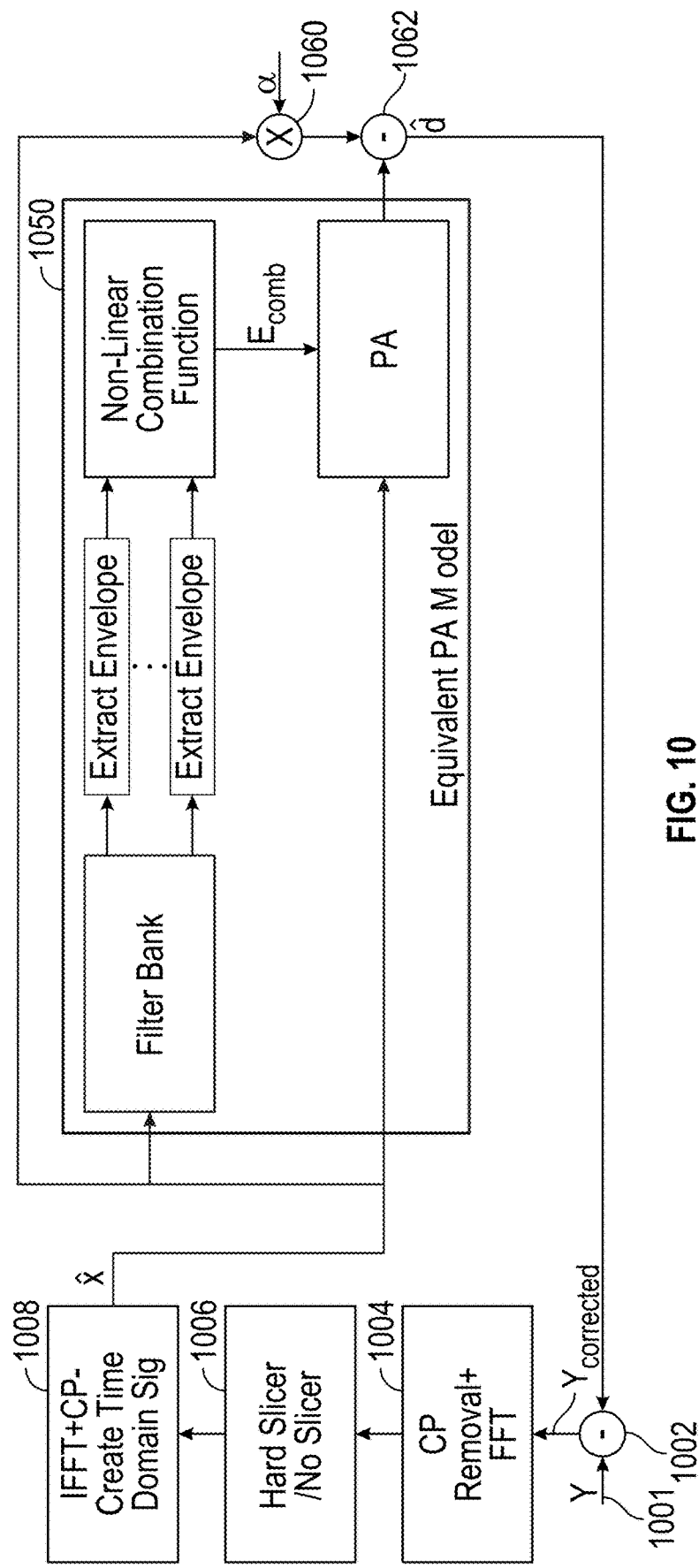
FIG. 10 illustrates a receiver distortion correction technique.

FIG. 10 illustrates a receiver DPoD correction technique. A receiver device may receive an indication of an equivalent power amplifier model associated with a power amplifier system of a transmitter device to be used for the DPoD correction. For example, the transmitter device may indicate characteristics associated with the amplification system 950, such as filter bank characteristics, a combination function used for combining subband envelopes, and the PA response as a function of x and $E_{comb}$.

The DPoD correction technique may include estimating distortion of a received signal using the power amplifier model of the amplification system used by the transmitter device. For example, a received signal y(x) may be represented using the equation:

$$y(x) = \alpha x + d.$$

Using an iteration loop as shown in FIG. 10, the distortion $\hat{d}$ may be estimated. For example, at 1002, the signal y received at node 1001 may be used to generate a $y_{corrected}$ signal using the equation:

$$y_{corrected} = y - \hat{d}.$$

At block 1004, the cyclic prefix (CP) of $y_{corrected}$ may be removed. At block 1006 and block 1008, a slicing operation may be performed, based on the equation:

$$\hat{x} = \{ifft\left(\arg_x(\min)\left|\{FFT(y)\}_{corrected}\right) - FFT(\alpha x)\right|^2\right) \text{equation: } \hat{x} = \frac{y_{corrected}}{\alpha},$$

where $\alpha$ is a Bussgang coefficient and is determined from modeling distortion as a nonlinear additive noise.

A fast Fourier transform (FFT) may be performed to convert $y_{corrected}$ (with the removed CP) from the time domain to the frequency domain At block 1006, the slicing operation $$\left(e.g., \arg_x(\min)\left|\{FFT(y)\}_{corrected}) - FFT(\alpha x)\right|^2 lculation\right)$$

is performed to determine the closest modulation symbol (e.g., QAM symbol) to $y_{corrected}$. At 1008, an inverse FFT (ifft) is performed to convert the result of $$\arg_x(\min)\left|\{FFT(y)\}_{corrected}) - FFT(\alpha x)\right|^2$$

om the frequency domain to the time domain, and add the previously removed CP to the time domain signal, generating the time domain signal $\hat{x}$. The distortion $\hat{d}$ is then calculated using the equivalent power amplifier (PA) model 1050 received from the transmitter using equation:

$$\hat{d} = \text{equivalent PA model}(\hat{x}) - \alpha \hat{x}$$

In other words, the time domain signal $\hat{x}$ is multiplied by $\alpha$ at 1060, and is substracted from equivalent PA model($\hat{x}$) at 1062 to generate distortion $\hat{d}$, as shown. The output of the DPoD correction operations is equal to y−$\hat{d}$ which is used to determine the distortion compensated received signal.

The equivalent power amplifier model 1050 is an equivalent representation of the amplification system 950 described with respect to FIG. 9. The power amplifier model 1050 may include a model of the PA 416, filter bank 906, combination function 910, or any combination thereof. As used herein, compensating for distortion generally refers to any reduction of distortion of a received signal.

Figure 11:
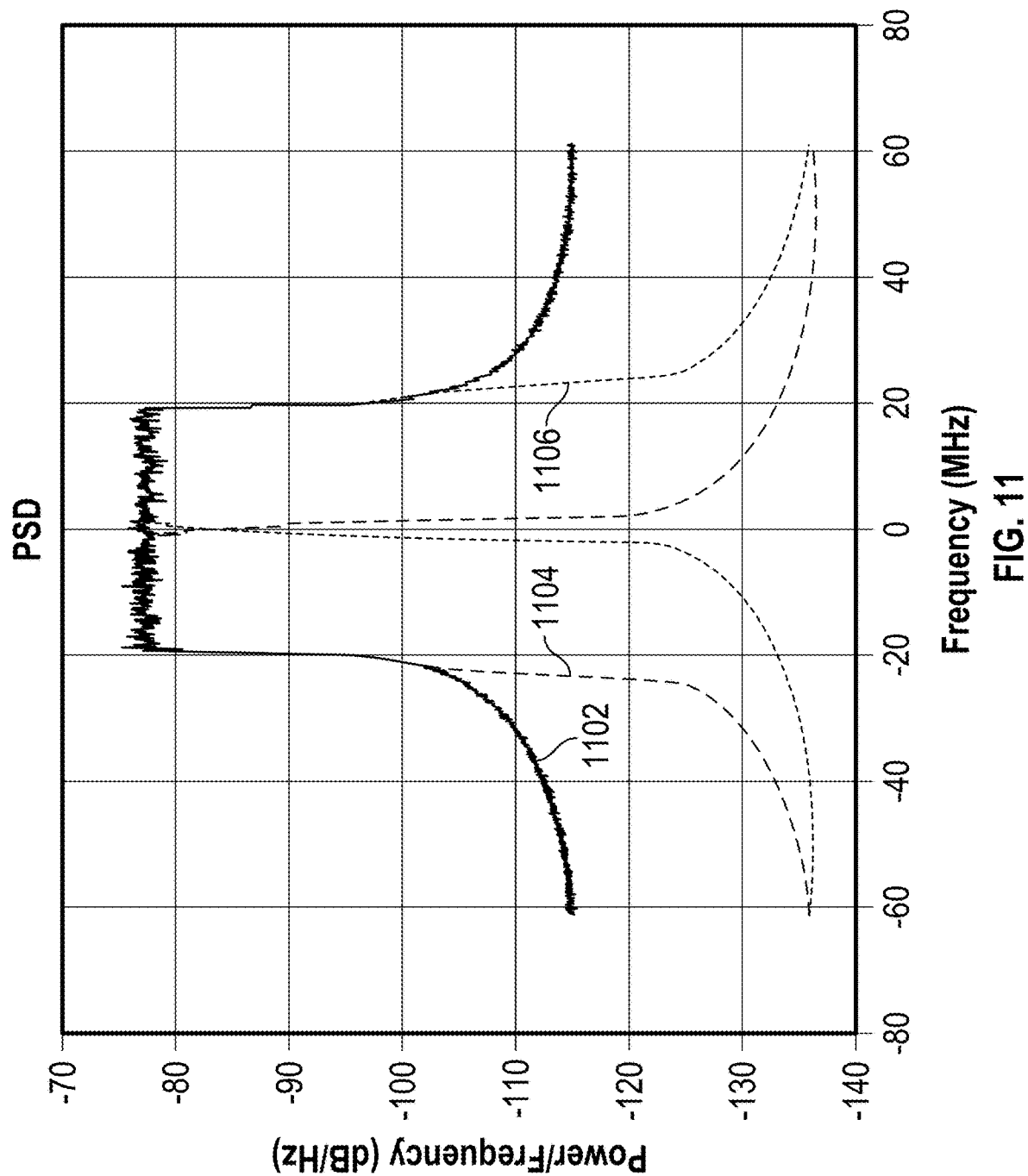
FIG. 11 illustrates a power spectral density (PSD) associated with subbands of a wideband signal.

FIG. 11 illustrates a power spectral density (PSD) associated with a 40 MHz signal 1102 that may be provided to a filter bank, along with two narrowband (subband) outputs 1104, 1106 of the filter bank. Based on the 20 MHz narrowband signals, envelopes $E_1(t)$, $E_2(t)$ may be detected. The combination function may take a form as shown by the equation:

$$E_{comb}(t) = \max(E_1(t), E_2(t)) + \alpha \min(E_1(t), E_2(t)),$$

where the parameter $\alpha$ is selected to set a desired tradeoff between backoff and distortion.

Figure 12A:
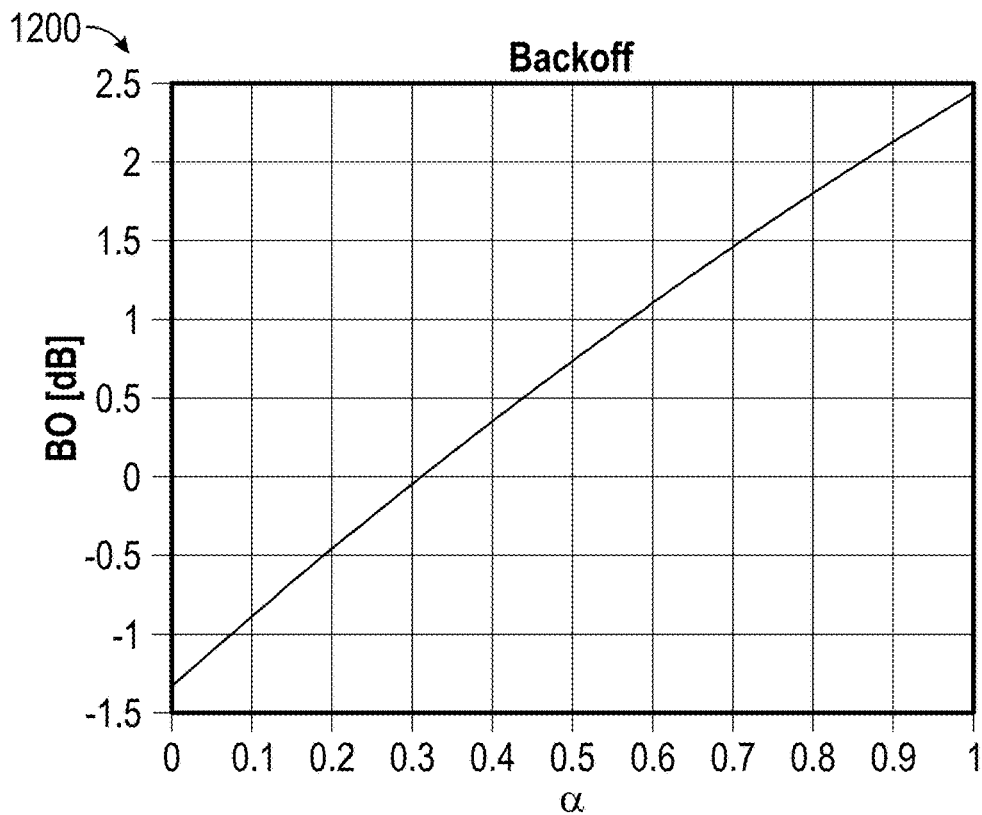
FIGS. 12A and 12B are graphs showing example backoff and distortion values, in accordance with certain aspects of the present disclosure
Figure 12B:
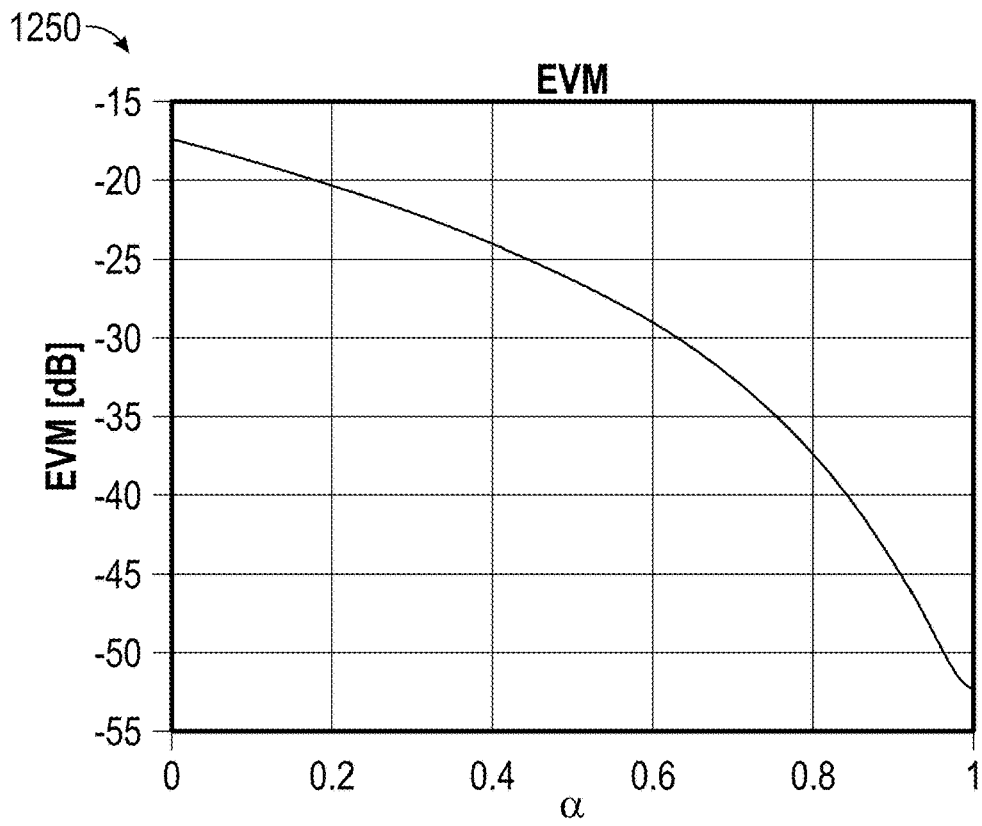

FIG. 12A is a graph 1200 showing example backoff values as a function of $\alpha$, in accordance with certain aspects of the present disclosure. FIG. 12B is a graph 1250 showing the transmitter EVM (e.g., distortion) of the PA output as a function of $\alpha$, in accordance with certain aspects of the present disclosure. For a 16 QAM modulation scheme, $\alpha$ may be set to 0.45 which provides an EVM of −25 dB and a backoff of 0.54 dB. For a 64 QAM modulation scheme, $\alpha$ may be set to 0.67 which provides an EVM of −31 dB and a backoff of 1.34 dB. For a 256 QAM modulation scheme, $\alpha$ may be set to 0.8 which provides an EVM of −37 dB and a backoff of 1.79 dB.

The following table shows the minimum value of $\alpha$ per modulation scheme (e.g., 16 QAM, 64 QAM, or 256 QAM) to obtain a sufficient EVM, and the corresponding backoff:

| Modulation | $\alpha_{min}$ | Backoff [dB] |
| --- | --- | --- |
| 16 QAM | 0.45 (for −25 dB) | 0.54 |
| 64 QAM | 0.67 (for −31 dB) | 1.34 |
| 256 QAM | 0.8 (for −37 dB) | 1.79 |

Figure 13:
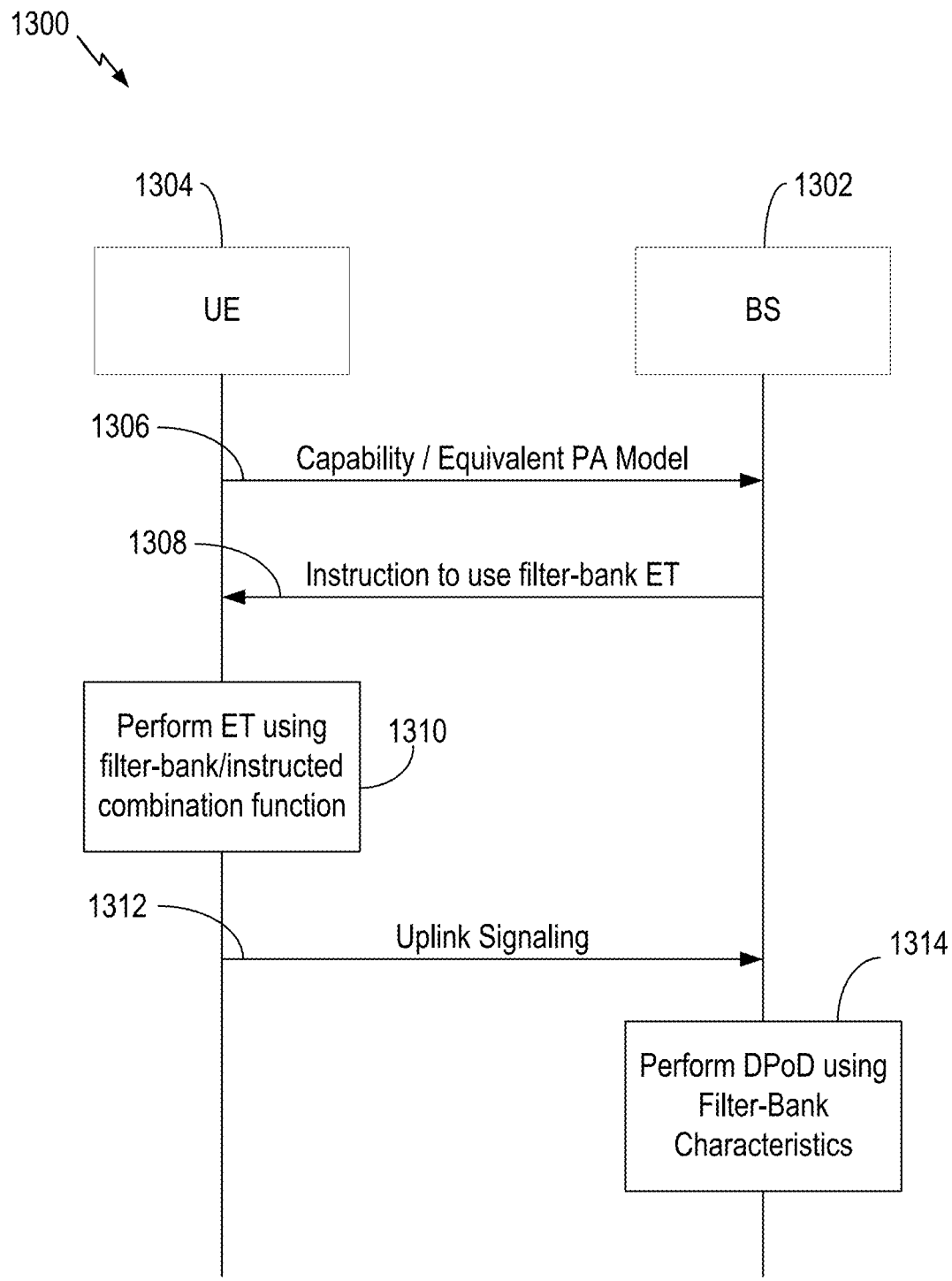
FIG. 13 is a call flow diagram illustrating example operations for performing filter bank envelope tracking for uplink signaling.

FIG. 13 is a call flow diagram illustrating example operations 1300 for performing filter bank ET for uplink signaling, in accordance with certain aspects of the present disclosure. As shown, a UE 1304 may send signaling 1306, to the base station 1302, indicating the UE' s capability to apply the filter bank ET technique described herein. In some aspects, the signaling 1306 may also indicate the maximum supported bandwidth of the UE. For example, the UE may indicate that the UE is capable of handling up to a 100 MHz signal using a filter bank providing 20 MHz sub-bands, as described.

In some aspects, the signaling 1306 may also indicate characteristics of the amplification system (e.g., amplification system 950) to be used for DPoD correction, as described herein. For example, the signaling 1306 may indicate the filter bank characteristics to enable the base station 1302 to create the equivalent PA model for DPoD correction. The filter bank characteristics may be fixed or dependent on signal bandwidth. In other words, multiple filter bank characteristics may be signaled to the base station, where one of the filter bank characteristics is selected and used for DPoD correction depending on a configured signal bandwidth for uplink signaling.

In some aspects, the base station may instruct (e.g., via signaling 1308) the UE how to combine the envelopes of the filter bank based on the base station DPoD correction capabilities (e.g., as well as the information provided via signaling 1306). The signaling 1308 may involve sending a combination function to be used or weights (e.g., $\alpha$) per modulation. The signaling 1308 may be a radio resource control (RRC) message, in some aspects. The UE may dynamically select a specific combination function based on the modulation used in each UL allocation. This combination function may be signaled dynamically per UL allocation (e.g., in DCI) or changed semi-statically.

The characteristics of the amplification system 950 signaled may include a PA response which may be a function of $E_{comb}$ in addition to being a function of the input x as described herein. That is, the PA output may be characterized as:

$$y=PA(x, E_{comb}).$$

At block 1310, the UE 1304 may perform ET using the filter bank and instructed combination function to transmit uplink signaling 1312. At block 1314, the base station 1302 performs DPoD correction using the amplification system characteristics (e.g., characteristics of the filter bank, combination function, PA response), as described.

Aspects Related to Envelope Tracking for Signals in Downlink

The aspects described herein may be applied to implement envelope tracking for downlink signaling. For the downlink, the aspects described herein facilitate efficiency improvements at a base station (e.g., the transmitter), with residual distortion correction being implemented at a UE (e.g., the receiver). The base station may perform frequency division multiplexing (FDM) for several users for a downlink application. As a result, the DPoD correction algorithm may be implemented based on the FDMed users (e.g., based on the modulation used by each user).

Figure 14:
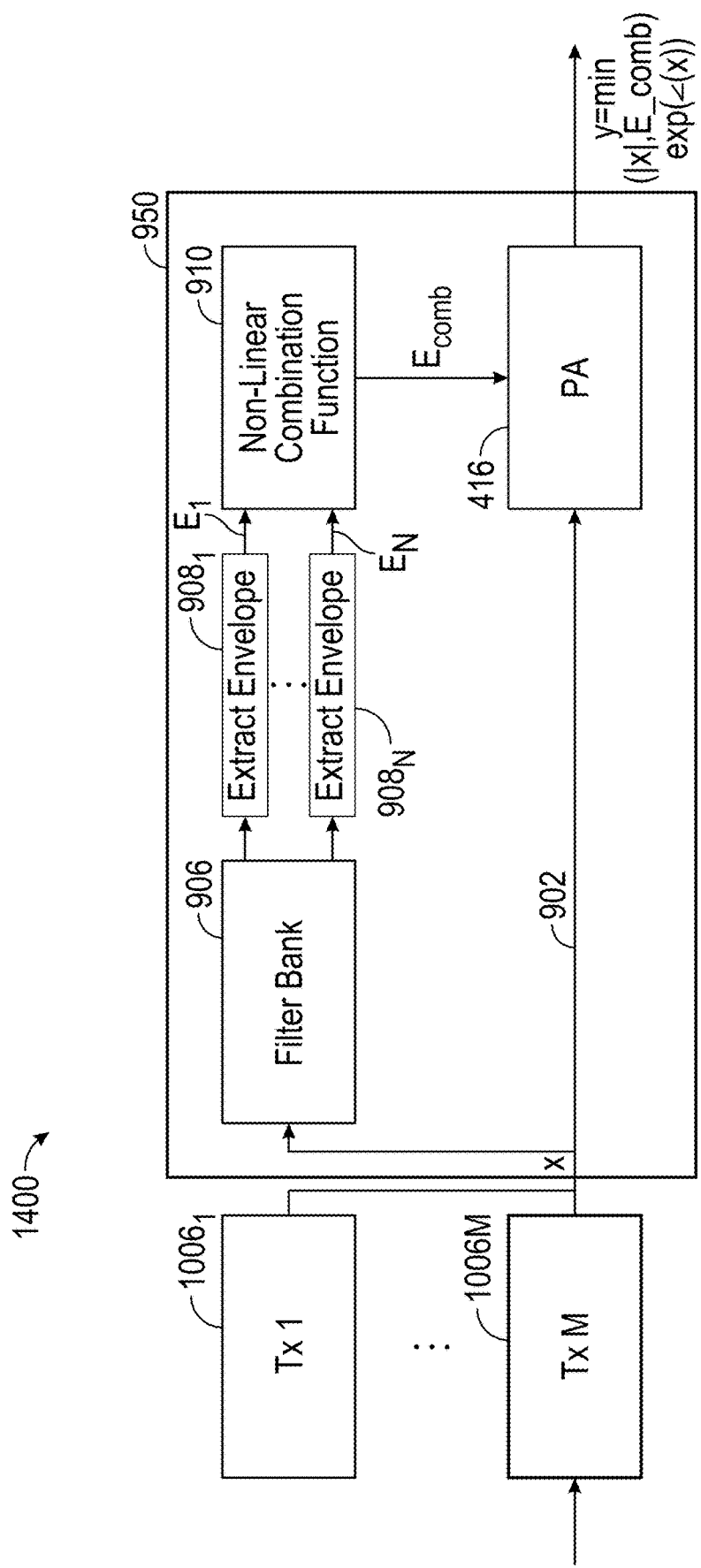
FIG. 14 illustrates an example RF front end implementing filter bank envelope tracking for downlink signaling.

FIG. 14 illustrates an example RF front end 1400 in accordance with certain aspects of the present disclosure. As shown, M users may be multiplexed (e.g., using FDM) using respective transmitters Tx 1 to Tx M, M being any integer greater than 1. The composite transmit signal at node 902 (e.g., generated by summation of transmit signals of all users) is transmitted via the amplification system having the PA 416, where the power supply of the PA 416 is modulated by envelope tracking circuitry, as described herein.

Figure 15:
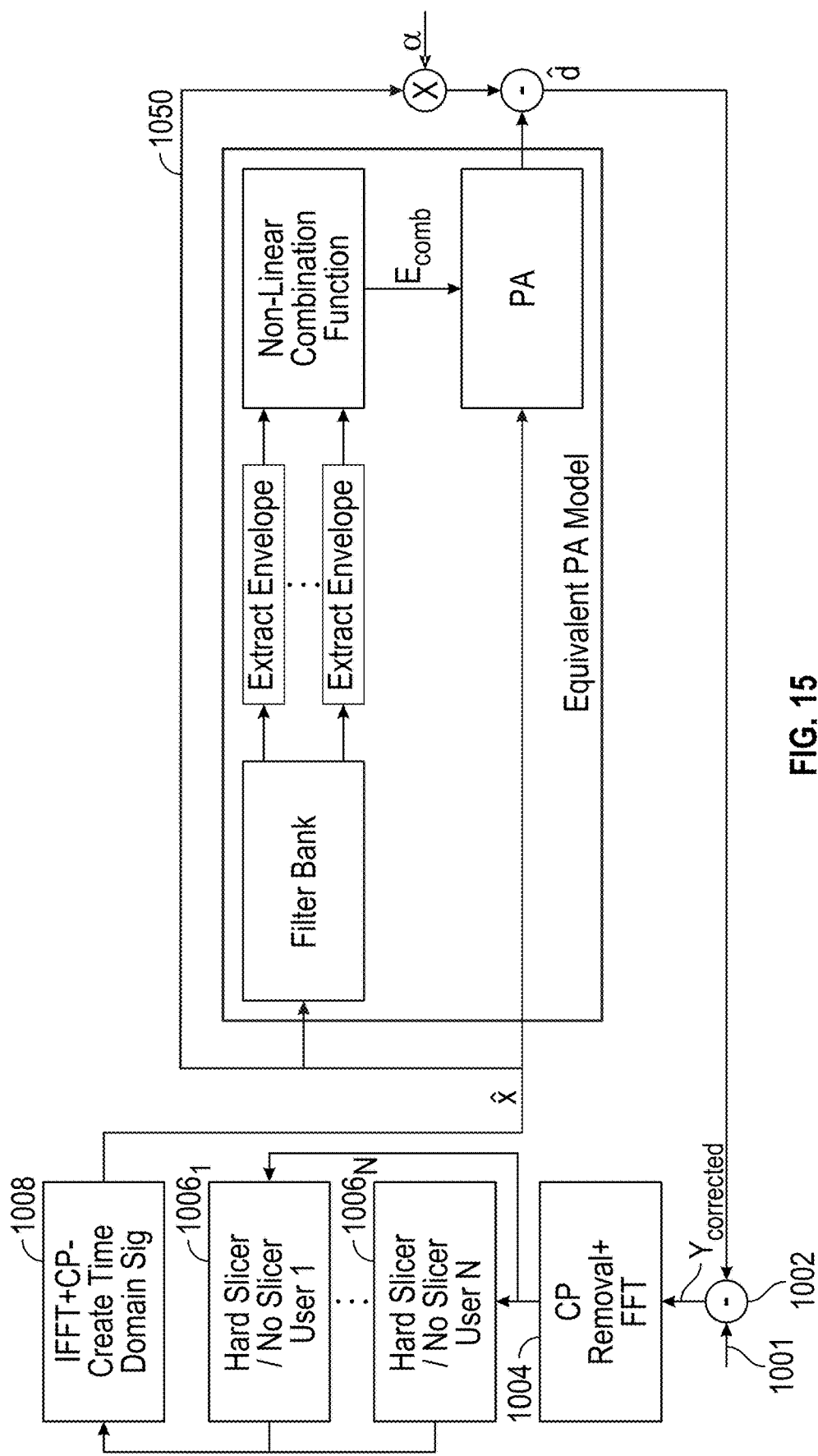
FIG. 15 illustrates a receiver distortion correction technique when multiple users are multiplexed.

FIG. 15 illustrates a receiver DPoD correction technique when multiple users are multiplexed (e.g., by a base station). As shown, the slicer stages may occur per FDMed user at respective blocks 1006$_1$ to 1006$_M$. For that purpose, the base station may signal to the UE information associated with multiplexed users, such as the allocated users, the user's resource allocation, the respective modulation schemes and pilot structures, to be used for DPoD correction.

Alternatively, no slicing may be performed. In other words, DPoD correction may be performed without operations at blocks 1006$_1$ to 1006$_M$. Without slicing, the information associated with the users may not be signaled to the UE. In addition, a time domain-only processing may be performed (e.g., without performing FFT/IFFT operations at one or more of blocks 1006$_1$ to 1006$_M$ described with respect to FIG. 15). In some cases, slicing is performed for certain users, and time-domain only iterations are performed for other users.

In some cases, users may be spatial division multiplexed. In this case, transmission by the base station to the different users may be via beamforming; therefore, a transmission to one user (e.g., UE) may not reach another user, but may still impact the envelope at the other user. As a result, the other user may not identify and correct for the impact of the beamforming to the envelope. In some aspects, if spatial division multiplexing of different users is being used, the base station might not activate the filter bank ET DPoD correction for such an allocation. In case that DPoD correction is not applied, the base station selects the combination function such that a sufficient EVM is achieved (e.g., with little distortion). Generally, the DPoD correction may be turned on or off semi-statically (e.g., via the signaling 1308 by the base station) or determined based on pre-configured rules (e.g., transmission bandwidth, modulation, etc.) signaled in RRC signaling.

Figure 16:
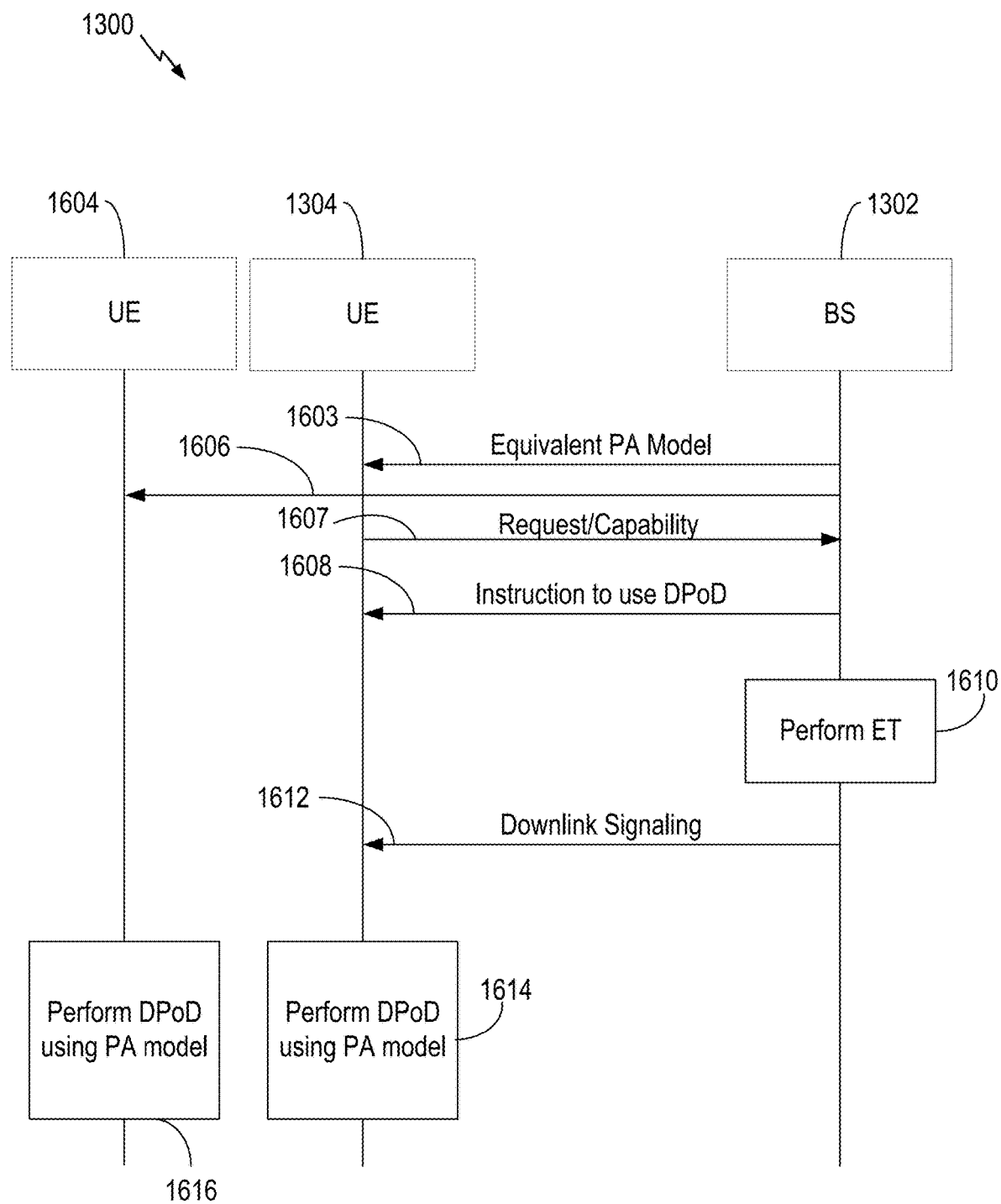
FIG. 16 is a flow diagram illustrating envelope tracking and distortion correction for downlink signaling.

FIG. 16 is a flow diagram illustrating envelope tracking and DPoD correction for downlink signaling. As shown, UEs 1304, 1604 which are to be frequency division multiplexed, may receive an equivalent PA model via signalings 1603, 1606. For example, base station 1302 may indicate the filter bank characteristics to enable each UE to determine the equivalent PA model. The filter bank characteristics may be fixed or dependent on signal bandwidth, and therefore, multiple filter bank characteristics associated with different bandwidths may be signaled, as described herein.

In some cases, a UE (e.g., UE 1304) may send signaling 1607 with a request to the base station 1302 requesting a particular combination function to use, based on the UE DPoD correction capabilities. The signaling could be performed by sending the combination function or weights per modulation (e.g., as part of an RRC message). The base station may dynamically determine the usage of the combination function or weights based on the modulation used in each downlink allocation. The base station may signal (e.g., via instruction 1608) to the UE the selected combination function or weights, once selected (e.g., based on the request from the UE). The function may be signaled dynamically per downlink allocation (e.g., in DCI) or changed semi-statically.

If a current downlink transmission includes users with different modulations that are FDMed, the base station may consider several options. For example, the base station may use the combination function or weights that yield the best-case EVM, at the cost of greater backoff (e.g., corresponding to the highest modulation). The base station may use a weighted average of combination functions or weights based on users' respective bandwidths. In some cases, the base station may use the combination function or weights corresponding to the user's modulation and signal to the UE that no slicing should be applied for other users.

As shown, at block 1610, the base station may perform envelope tracking for transmission of downlink signaling 1612 that is frequency division multiplexed to UEs 1304, 1604. The UEs 1304, 1604 performed DPoD correction, at respective blocks 1614, 1616, for processing the downlink signaling 1612 using the equivalent PA model, as described.

Example Operations for Envelope Tracking and Post Distortion Correction

Figure 17:
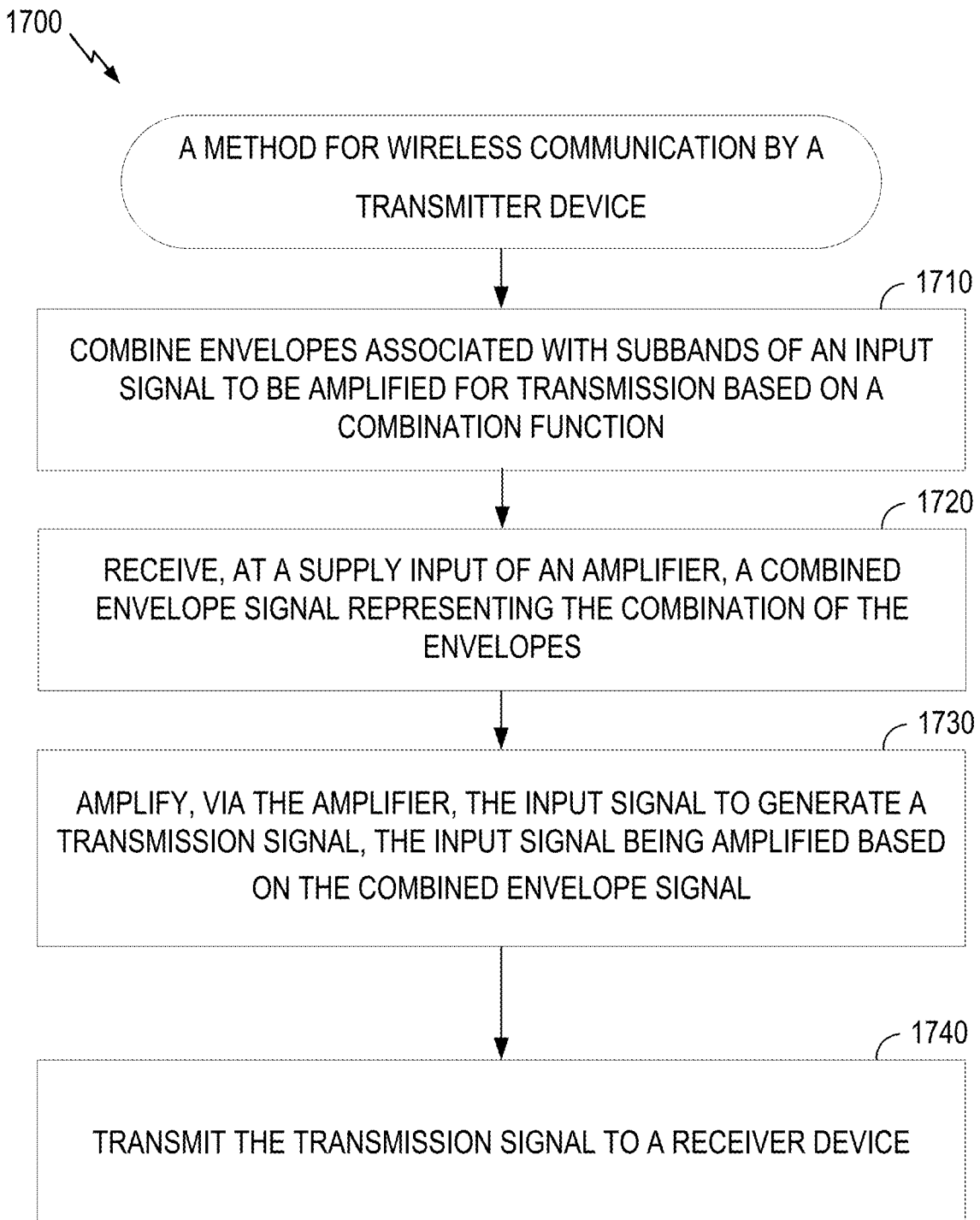
FIG. 17 is a flow diagram illustrating example operations for wireless communication by a transmitter device.

FIG. 17 is a flow diagram illustrating example operations 1700 for wireless communication, in accordance with certain aspects of the present disclosure. The operations 1700 may be performed, for example, by a transmitter device, such as a UE (e.g., a UE 104 in the wireless communication network 100 of FIG. 1) or a BS (e.g., such as the BS 102 in the wireless communication network 100 of FIG. 1).

Operations 1700 may be implemented as software components that are executed and run on one or more processors (e.g., controller/processor 280 of FIG. 2 or controller/processor 240 of FIG. 2). Further, the transmission and reception of signals by the UE in operations 1700 may be enabled, for example, by one or more antennas (e.g., antennas 252 of FIG. 2 or antennas 234 of FIG. 2). In certain aspects, the transmission and/or reception of signals by the UE or BS may be implemented via a bus interface of one or more processors (e.g., controller/processor 280, envelope tracking component 281 of FIG. 2, controller/processor 240, envelope tracking component 241 of FIG. 2) obtaining and/or outputting signals.

The operations 1700 begin, at block 1710, with the transmitter device combining envelopes associated with subbands of an input signal (e.g., input signal at node 902 of FIG. 9) to be amplified for transmission based on a combination function (e.g., a nonlinear combination function). At block 1720, the transmitter device receives, at a supply input of an amplifier, a combined envelope signal representing the combination of the envelopes. At block 1730, the transmitter device amplifies, via the amplifier (e.g., PA 416), the input signal to generate a transmission signal, the input signal being amplified based on the combined envelope signal. At block 1740, the transmitter device transmits the transmission signal to a receiver device. In some aspects, the transmitter device generates, via a filter bank (e.g., filter bank 906), signals associated with the subbands of the input signal, and determines the envelopes associated with the subbands based on the generated signals associated with the subbands of the input signal.

In some aspects, the transmitter device determines the combination function based on a modulation scheme to be used for the transmission signal. In some aspects, the envelopes are combined using a respective weight associated with each respective envelope of the envelopes.

Figure 18:
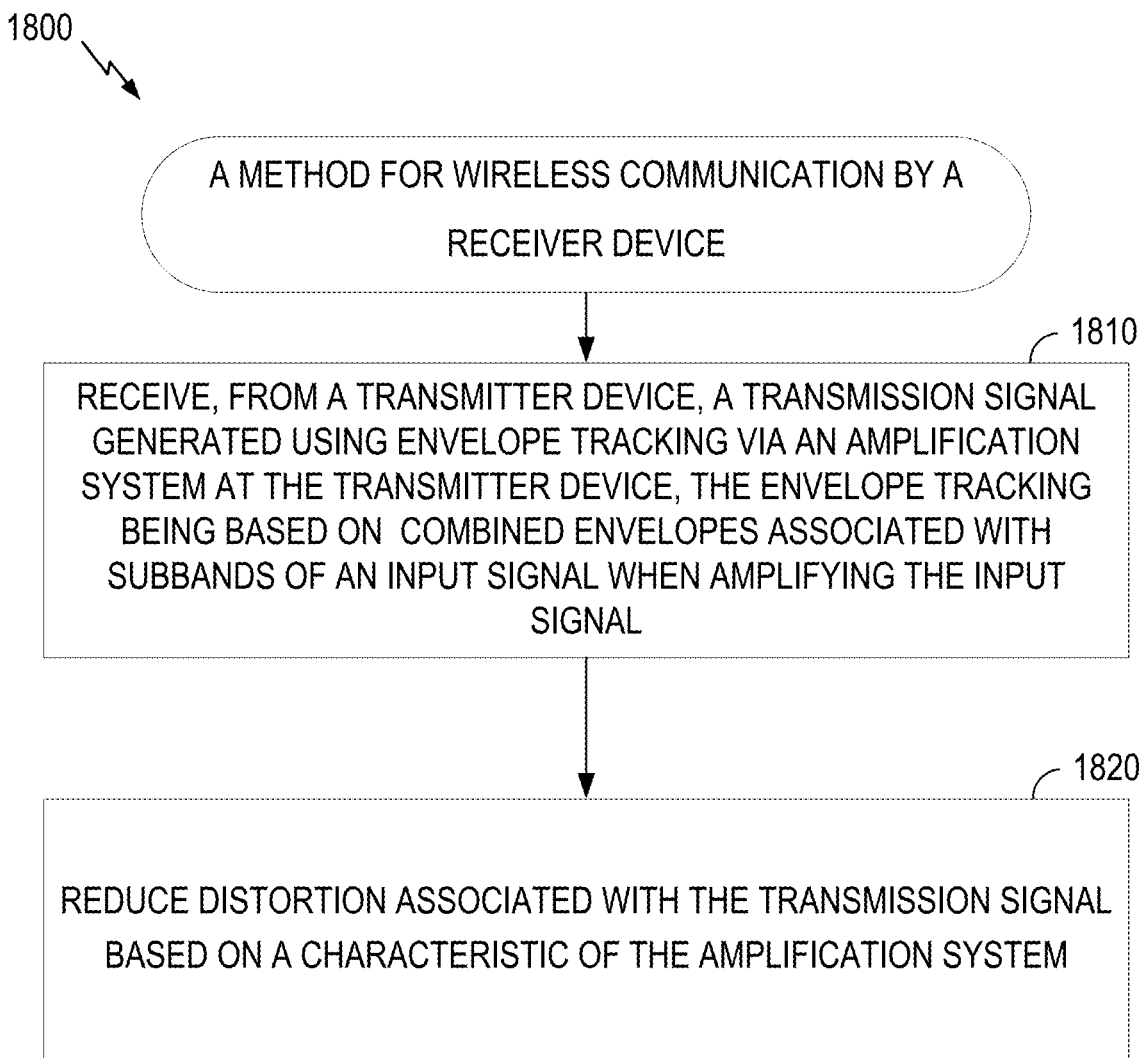
FIG. 18 is a flow diagram illustrating example operations for wireless communication by a receiver device.

FIG. 18 is a flow diagram illustrating example operations 1800 for wireless communication, in accordance with certain aspects of the present disclosure. The operations 1800 may be performed, for example, by a transmitter device, such as a UE (e.g., a UE 104 in the wireless communication network 100 of FIG. 1) or a BS (e.g., such as the BS 102 in the wireless communication network 100 of FIG. 1).

Operations 1800 may be implemented as software components that are executed and run on one or more processors (e.g., controller/processor 280 of FIG. 2 or controller/processor 240 of FIG. 2). Further, the transmission and reception of signals by the UE in operations 1800 may be enabled, for example, by one or more antennas (e.g., antennas 252 of FIG. 2 or antennas 234 of FIG. 2). In certain aspects, the transmission and/or reception of signals by the UE or BS may be implemented via a bus interface of one or more processors (e.g., controller/processor 280, envelope tracking component 281 of FIG. 2, controller/processor 240, envelope tracking component 241 of FIG. 2) obtaining and/or outputting signals.

The operations 1800 begin, at block 1810, with the receiver device receiving, from a transmitter device, a transmission signal generated using envelope tracking via an amplification system at the transmitter device, the envelope tracking being based on combined envelopes associated with subbands of an input signal when amplifying the input signal. At block 1820, the receiver device reduces distortion associated with the transmission signal based on a characteristic of the amplification system. The characteristic may include a characteristic of a filter bank for generating signals associated with the subbands, a combination function used to combine the envelopes, a response of an amplifier (e.g., PA 416) used to amplify the input signal, or any combination thereof. The response may be a function of parameters associated with the input signal and a power supply signal of PA 416. In some aspects, reducing the distortion may include determining the distortion associated with the transmission signal based on the characteristic of the amplification system, and removing the distortion from the transmission signal.

Example Signaling Aspects for Envelope Tracking and Post Distortion Correction

Figure 19:
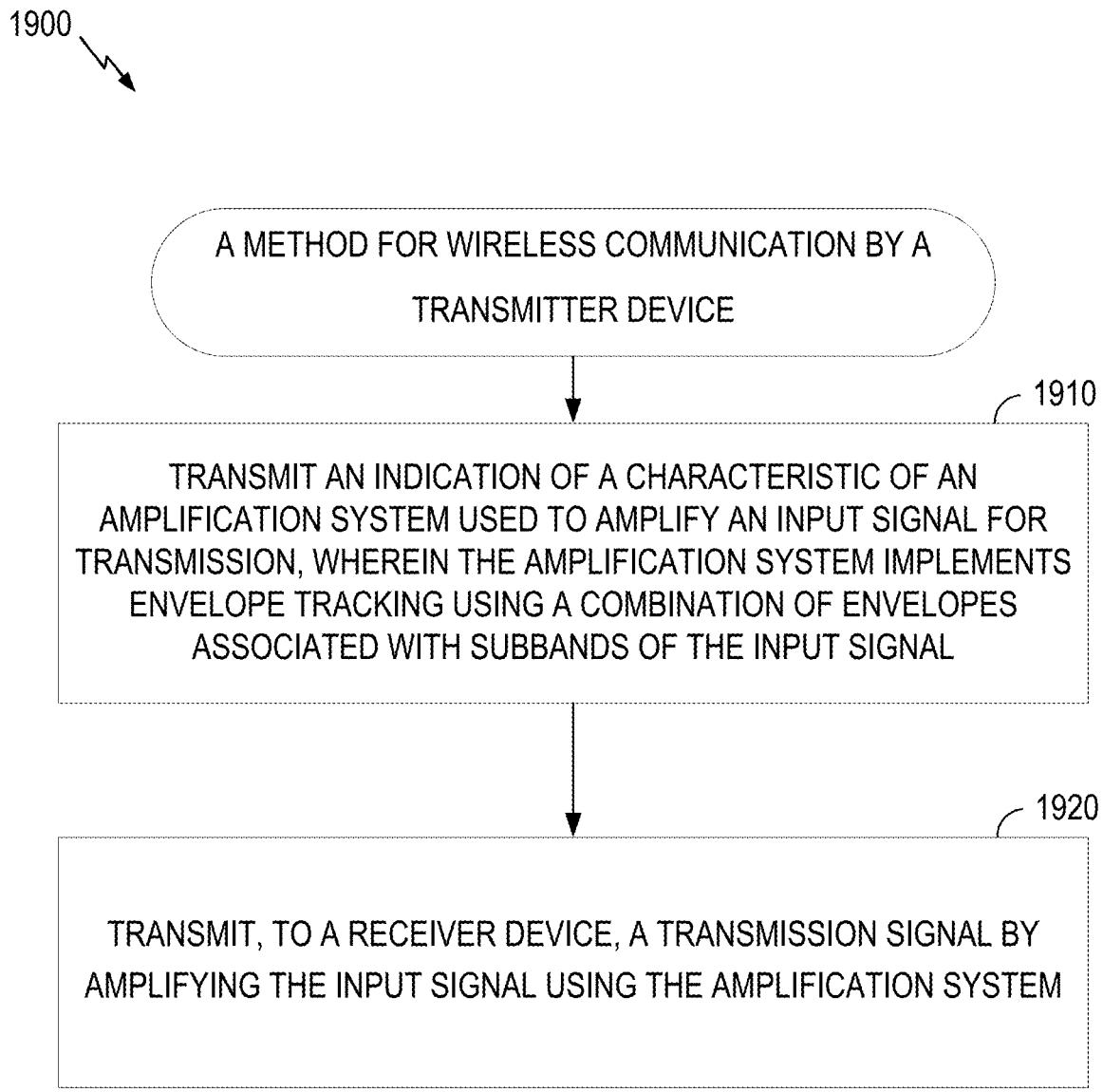
FIG. 19 is a flow diagram illustrating example operations for wireless communication of information for envelope tracking by a transmitter device.

FIG. 19 is a flow diagram illustrating example operations 1900 for wireless communication, in accordance with certain aspects of the present disclosure. The operations 1900 may be performed, for example, by a transmitter device, such as a UE (e.g., a UE 104 in the wireless communication network 100 of FIG. 1) or a BS (e.g., such as the BS 102 in the wireless communication network 100 of FIG. 1).

Operations 1900 may be implemented as software components that are executed and run on one or more processors (e.g., controller/processor 280 of FIG. 2 or controller/processor 240 of FIG. 2). Further, the transmission and reception of signals by the UE in operations 1900 may be enabled, for example, by one or more antennas (e.g., antennas 252 of FIG. 2 or antennas 234 of FIG. 2). In certain aspects, the transmission and/or reception of signals by the UE or BS may be implemented via a bus interface of one or more processors (e.g., controller/processor 280, envelope tracking component 281 of FIG. 2, controller/processor 240, envelope tracking component 241 of FIG. 2) obtaining and/or outputting signals.

The operations 1900 begin, at block 1910, with the transmitter device transmitting an indication of a characteristic of an amplification system (e.g., an equivalent PA model) used to amplify an input signal for transmission. The amplification system implements envelope tracking using a combination of envelopes associated with subbands of the input signal. Transmitting the indication may include transmitting an indication of a characteristic of a filter bank for generating signals associated with the subbands.

In some aspects, transmitting the indication includes transmitting an indication of a combination function used to combine the envelopes. For example, the transmitter device may receive an indication of a combination function to use for performing the combination of the envelopes.

In some aspects, transmitting the indication of the characteristic includes transmitting an indication of a response of an amplifier used to perform the amplifying of the input signal. The response may be a function of parameters associated with the input signal and a power supply signal of an amplifier used to amplify the input signal.

At block 1920, the transmitter device transmits, to a receiver device, a transmission signal by amplifying the input signal using the amplification system. In some aspects, the transmitter device transmits an indication of a capability (e.g., via signaling 1306 of FIG. 13) of the transmitter device to support the envelope tracking, and receives an indication to perform the envelope tracking in response to the transmission of the indication of the capability. In certain aspects, the transmitter device (e.g., UE 1304 of FIG. 13) transmits an indication of the subbands that are supported and a supported bandwidth for the input signal.

In some aspects, the transmitter device (e.g., BS 1302 of FIG. 13) transmits signaling to activate or deactivate operations for reducing, at the receiver device, distortion associated with the envelope tracking. For example, the transmitter device may receive an indication of a capability of the receiver device to support distortion reduction operations, and determine whether to activate or deactivate operations for reducing distortion based on the capability, where the signaling to activate or deactivate is based on the determination.

In some aspects, transmitting the transmission signal includes frequency division multiplexing transmissions to multiple receiver devices (e.g., UEs 1304 of FIG. 13, 1604 of FIG. 16). In this case, the operations 1900 may also include transmitting information associated with the frequency division multiplexing of the multiple receiver devices. For example, the information may include at least one of a frequency allocation of each of the multiple receiver devices, a modulation scheme used by each of the multiple receiver devices, or reference signal information associated with each of the multiple receiver devices.

Figure 20:
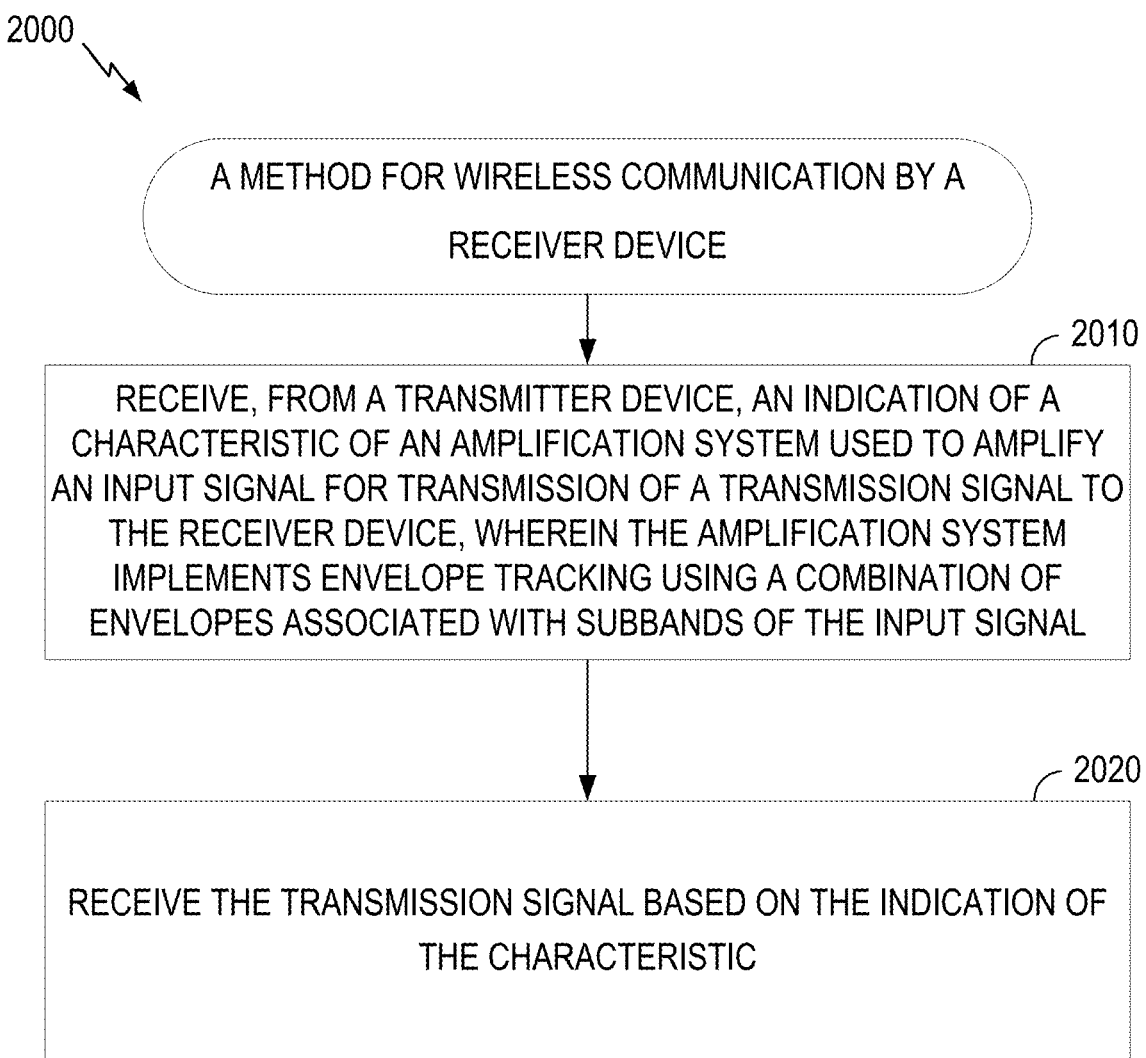
FIG. 20 is a flow diagram illustrating example operations for wireless communication of information for distortion reduction by a receiver device.

FIG. 20 is a flow diagram illustrating example operations 2000 for wireless communication, in accordance with certain aspects of the present disclosure. The operations 2000 may be performed, for example, by a transmitter device, such as a UE (e.g., a UE 104 in the wireless communication network 100 of FIG. 1) or a BS (e.g., such as the BS 102 in the wireless communication network 100 of FIG. 1).

Operations 2000 may be implemented as software components that are executed and run on one or more processors (e.g., controller/processor 280 of FIG. 2 or controller/processor 240 of FIG. 2). Further, the transmission and reception of signals by the UE in operations 2000 may be enabled, for example, by one or more antennas (e.g., antennas 252 of FIG. 2 or antennas 234 of FIG. 2). In certain aspects, the transmission and/or reception of signals by the UE or BS may be implemented via a bus interface of one or more processors (e.g., controller/processor 280, envelope tracking component 281 of FIG. 2, controller/processor 240, envelope tracking component 241 of FIG. 2) obtaining and/or outputting signals.

The operations 2000 begin, at block 2010, with the receiver device receiving, from a transmitter device, an indication (e.g., via signaling 1306 of FIG. 13) of a characteristic of an amplification system used to amplify an input signal for transmission of a transmission signal to the receiver device. In some aspects, the amplification system implements envelope tracking using a combination of envelopes associated with subbands of the input signal. In some aspects, receiving the indication includes receiving an indication of a characteristic of a filter bank used to generate signals associated with the subbands. In some aspects, receiving the indication includes receiving an indication of a combination function used to combine the envelopes. In some aspects, receiving the indication includes receiving an indication of a response of an amplifier used to amplify the input signal. The response may be a function of parameters associated with the input signal and the combination of the envelopes.

At block 2020, the receiver device receives the transmission signal based on the indication of the characteristic. In some aspects, the receiver device receives an indication (e.g., via signaling 1306 of FIG. 13) of a capability of the transmitter device to support the envelope tracking by combining the envelopes associated with subbands, and transmits an indication (e.g., signaling 1308 of FIG. 13) to perform the envelope tracking by combining the envelopes based on the capability.

In some aspects, the receiver device receives, from the transmitter device, an indication (e.g., via signaling 1306 of FIG. 13) of the subbands that are supported and a supported bandwidth for the input signal, and transmits, to the transmitter device, a configuration (e.g., via signaling 1308 of FIG. 13) associated with the transmission signal based on the indication of the subbands that are supported and the supported bandwidth for the input signal.

In some aspects, the receiver device receives signaling (e.g., instruction 1608) to activate or deactivate, at the receiver device, distortion reduction operations associated with the envelope tracking. For example, the receiver device may transmit an indication (e.g., via signaling 1607 of FIG. 16) of a capability of the receiver device to support distortion reduction operations, where the signaling to activate or deactivate is based on the indication of the capability.

In some aspects, the transmission signal includes frequency division multiplexed signals to multiple receiver devices (e.g., UEs 1304 of FIG. 13, 1604 of FIG. 16). The receiver device may receive information (e.g., as part of signaling 1603 of FIG. 16) associated with frequency division multiplexing of the multiple receiver devices. Receiving the transmission signal may include reducing distortion associated with the envelope tracking based on the information. For example, the information may include at least one of a frequency allocation of each of the multiple receiver devices, a modulation scheme used by each of the multiple receiver devices, or reference signal information associated with each of the multiple receiver devices. In some aspects, the receiver device transmits an indication (e.g., via signaling 1607 of FIG. 16) of a combination function to use for performing the combination of the envelopes.

Example Wireless Communication Devices

Figure 21:
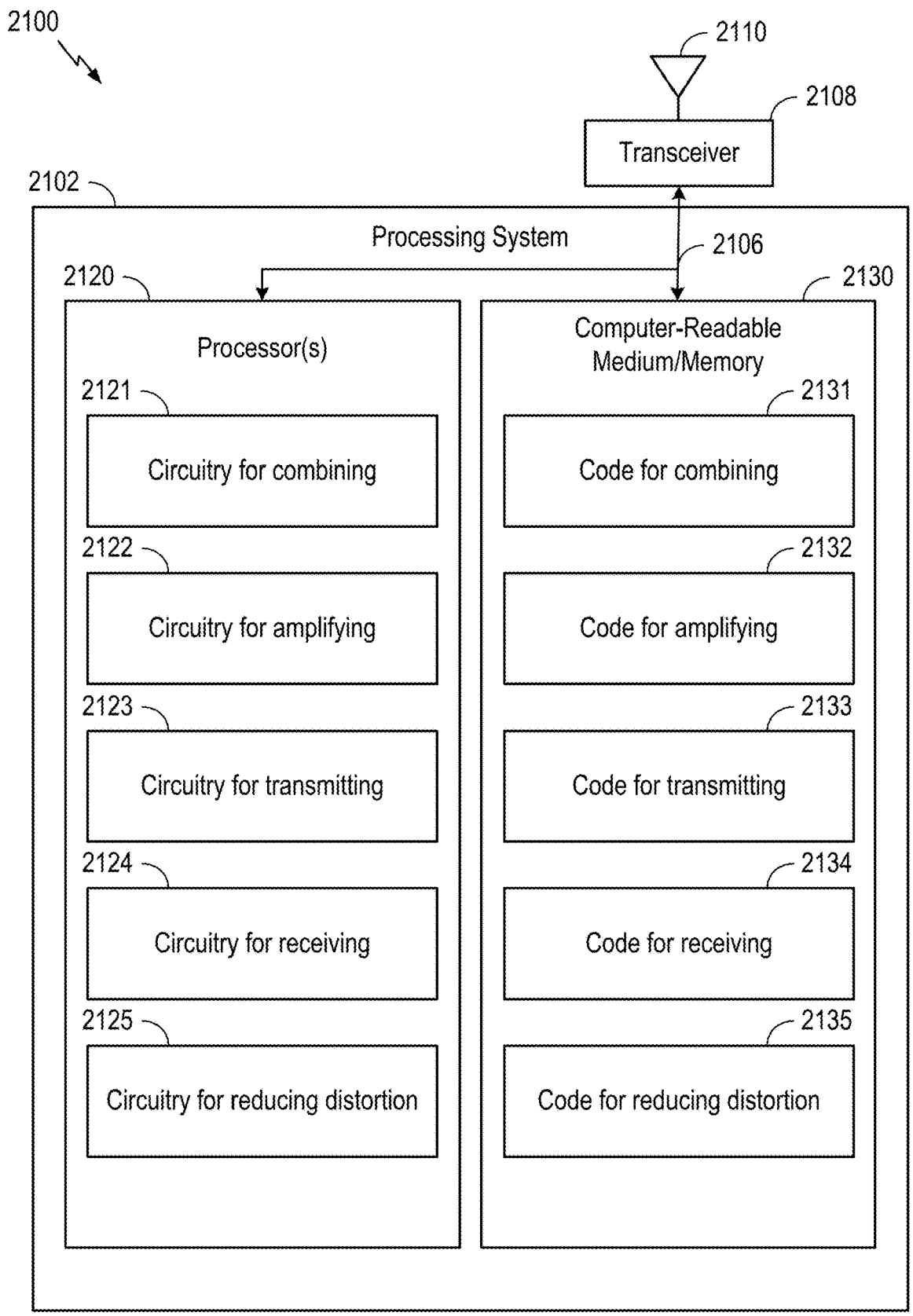
FIG. 21 depicts aspects of an example communications device.

FIG. 21 depicts an example communications device 2100 that includes various components operable, configured, or adapted to perform operations for the techniques disclosed herein, such as the operations depicted and described with respect to FIGS. 13, 16-20. In some examples, communication device 2100 may be a base station 102 as described, for example with respect to FIGS. 1 and 2.

Communications device 2100 includes a processing system 2102 coupled to a transceiver 2108 (e.g., a transmitter and/or a receiver). Transceiver 218 is configured to transmit (or send) and receive signals for the communications device 2100 via an antenna 2110, such as the various signals as described herein. Processing system 2102 may be configured to perform processing functions for communications device 2100, including processing signals received and/or to be transmitted by communications device 2100.

Processing system 2102 includes one or more processors 2120 coupled to a computer-readable medium/memory 2130 via a bus 2106. In certain aspects, computer-readable medium/memory 2130 is configured to store instructions (e.g., computer-executable code) that when executed by the one or more processors 2120, cause the one or more processors 2120 to perform the operations illustrated in FIGS. 13, 16-20, or other operations for performing the various techniques discussed herein for perform envelope tracking for signal transmission or perform distortion reduction for received signaling.

In the depicted example, computer-readable medium/memory 2130 stores code 2131 for combining, code 2132 for amplifying, code 2133 for transmitting, code 2134 for receiving, and code 2135 for reducing distortion.

In the depicted example, the one or more processors 2120 include circuitry configured to implement the code stored in the computer-readable medium/memory 2130, including circuitry 2121 for combining, circuitry 2122 for amplifying, circuitry 2123 for transmitting, circuitry 2124 for receiving, and circuitry 2125 for reducing distortion.

Various components of communications device 2100 may provide means for performing the methods described herein, including with respect to FIGS. 13, 16-20.

In some examples, means for transmitting or sending (or means for outputting for transmission) may include the transceivers 232 and/or antenna(s) 234 of the base station 102 illustrated in FIG. 2 and/or transceiver 218 and antenna 2110 of the communication device 2100.

In some examples, means for receiving (or means for obtaining) may include the transceivers 232 and/or antenna(s) 234 of the base station illustrated in FIG. 2 and/or transceiver 218 and antenna 2110 of the communication device 2100.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for combining, means for amplifying, means for transmitting, means for receiving, and means for reducing distortion may include various processing system components, such as: the one or more processors 2120, or aspects of the base station 102 depicted in FIG. 2, including receive processor 238, transmit processor 220, TX MIMO processor 230, and/or controller/processor 240 (including envelope tracking component 241).

Notably, FIG. 21 is an example, and many other examples and configurations of communication device 2100 are possible.

Figure 22:
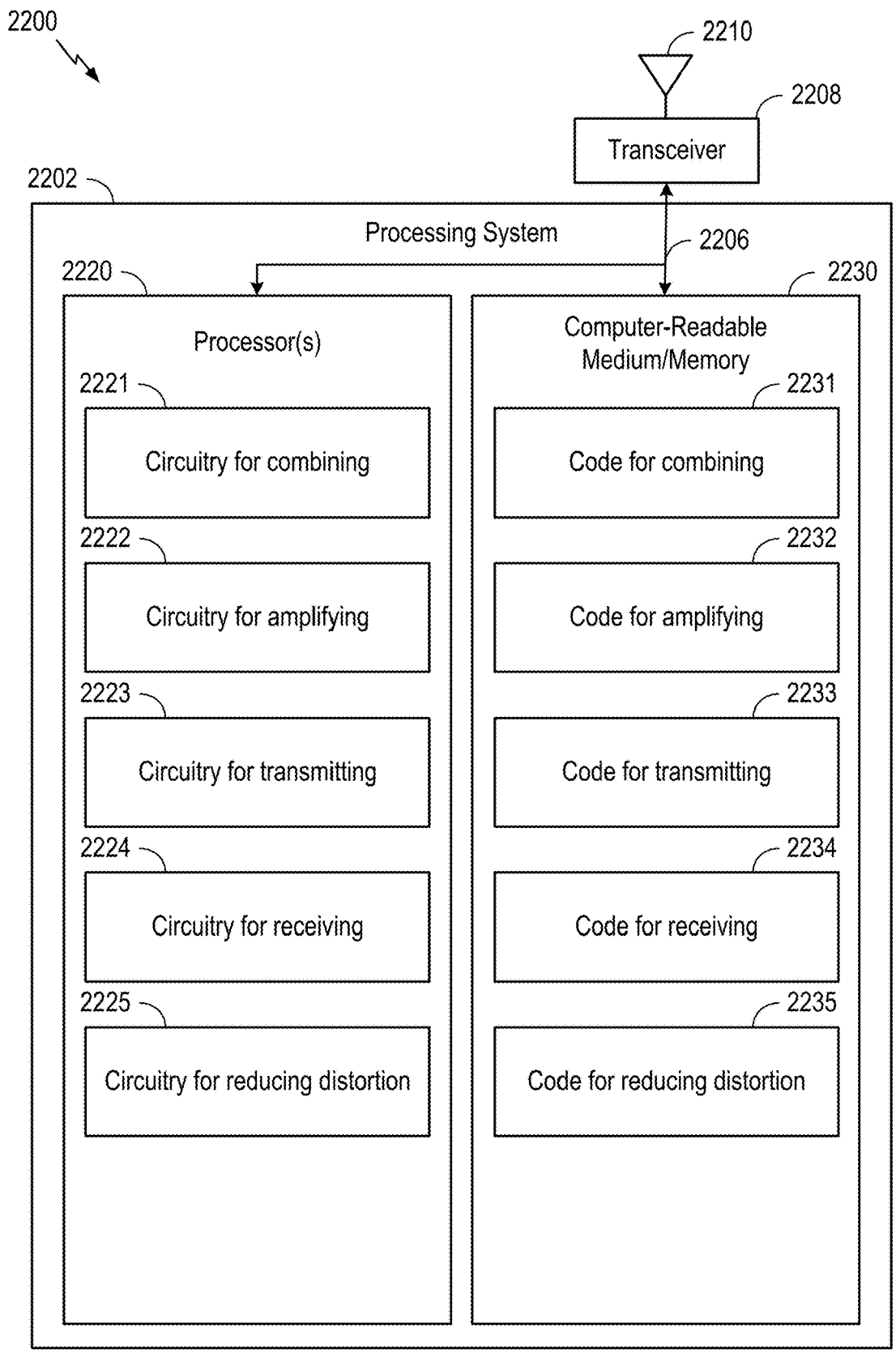
FIG. 22 depicts aspects of an example communications device.

FIG. 22 depicts an example communications device 2200 that includes various components operable, configured, or adapted to perform operations for the techniques disclosed herein, such as the operations depicted and described with respect to FIGS. 13, 16-20. In some examples, communication device 2200 may be a user equipment 104 as described, for example with respect to FIGS. 1 and 2.

Communications device 2200 includes a processing system 2202 coupled to a transceiver 2208 (e.g., a transmitter and/or a receiver). Transceiver 228 is configured to transmit (or send) and receive signals for the communications device 2200 via an antenna 2210, such as the various signals as described herein. Processing system 2202 may be configured to perform processing functions for communications device 2200, including processing signals received and/or to be transmitted by communications device 2200.

Processing system 2202 includes one or more processors 2220 coupled to a computer-readable medium/memory 2230 via a bus 2206. In certain aspects, computer-readable medium/memory 2230 is configured to store instructions (e.g., computer-executable code) that when executed by the one or more processors 2220, cause the one or more processors 2220 to perform the operations illustrated in FIGS. 13, 16-20, or other operations for performing the various techniques discussed herein for perform envelope tracking for signal transmission or perform distortion reduction for received signaling.

In the depicted example, computer-readable medium/memory 2230 stores code 2231 for combining, code 2232 for amplifying, code 2233 for transmitting, code 2234 for receiving, and code 2235 for reducing distortion.

In the depicted example, the one or more processors 2220 include circuitry configured to implement the code stored in the computer-readable medium/memory 2230, including circuitry 2221 for combining, circuitry 2222 for amplifying, circuitry 2223 for transmitting, circuitry 2224 for receiving, and circuitry 2225 for reducing distortion.

Various components of communications device 2200 may provide means for performing the methods described herein, including with respect to FIGS. 13, 16-20.

In some examples, means for transmitting or sending (or means for outputting for transmission) may include the transceivers 254 and/or antenna(s) 252 of the user equipment 104 illustrated in FIG. 2 and/or transceiver 228 and antenna 2210 of the communication device 2200.

In some examples, means for receiving (or means for obtaining) may include the transceivers 254 and/or antenna(s) 252 of the user equipment 104 illustrated in FIG. 2 and/or transceiver 228 and antenna 2210 of the communication device 2200.

In some examples, means for combining, means for amplifying, means for transmitting, means for receiving, and means for reducing distortion may include various processing system components, such as: the one or more processors 2220, or aspects of the user equipment 104 depicted in FIG. 2, including receive processor 258, transmit processor 264, TX MIMO processor 266, and/or controller/processor 280 (including envelope tracking component 281).

Notably, FIG. 22 is an example, and many other examples and configurations of communication device 2200 are possible.

Example Clauses

Implementation examples are described in the following numbered clauses:

Clause 1. A method for wireless communication by a transmitter device, comprising: combining envelopes associated with subbands of an input signal to be amplified for transmission based on a combination function; receiving, at a supply input of an amplifier, a combined envelope signal representing the combination of the envelopes; amplifying, via the amplifier, the input signal to generate a transmission signal, the input signal being amplified based on the combined envelope signal; and transmitting the transmission signal to a receiver device.

Clause 2. The method of clause 1, further comprising: generating, via a filter bank, signals associated with the subbands of the input signal; and determining the envelopes associated with the subbands based on the generated signals associated with the subbands of the input signal.

Clause 3. The method of any one of clauses 1-2, wherein the combination function is a nonlinear combination function.

Clause 4. The method of any one of clauses 1-3, further comprising determining the combination function based on a modulation scheme to be used for the transmission signal.

Clause 5. The method of any one of clauses 1-4, wherein the envelopes are combined using a respective weight associated with each respective envelope of the envelopes.

Clause 6. A method for wireless communication by a receiver device, comprising: receiving, from a transmitter device, a transmission signal generated using envelope tracking via an amplification system at the transmitter device, the envelope tracking being based on combined envelopes associated with subbands of an input signal when amplifying the input signal; and reducing distortion associated with the transmission signal based on a characteristic of the amplification system.

Clause 7. The method of clause 6, wherein the characteristic includes a characteristic of a filter bank for generating signals associated with the subbands.

Clause 8. The method of any one of clauses 6-7, wherein the characteristic includes a combination function used to combine the envelopes.

Clause 9. The method of any one of clauses 6-8, wherein the characteristic includes a response of an amplifier used to amplify the input signal.

Clause 10. The method of clause 9, wherein the response is a function of parameters associated with the input signal and the combination of the envelopes.

Clause 11. The method of any one of clauses 6-10, wherein reducing the distortion comprises: determining the distortion associated with the transmission signal based on the characteristic of the amplification system; and removing the distortion from the transmission signal.

Clause 12. A method for wireless communication by a transmitter device, comprising: transmitting an indication of a characteristic of an amplification system used to amplify an input signal for transmission, wherein the amplification system implements envelope tracking using a combination of envelopes associated with subbands of the input signal; and transmitting, to a receiver device, a transmission signal by amplifying the input signal using the amplification system.

Clause 13. The method of clause 12, further comprising: transmitting an indication of a capability of the transmitter device, the capability being to support the envelope tracking; and receiving an indication to perform the envelope tracking after the transmission of the indication of the capability.

Clause 14. The method of any one of clauses 12-13, wherein transmitting the indication comprises transmitting an indication of a characteristic of a filter bank for generating signals associated with the subbands.

Clause 15. The method of any one of clauses 12-14, wherein transmitting the indication comprises transmitting an indication of a combination function used to combine the envelopes.

Clause 16. The method of any one of clauses 12-15, further comprising receiving an indication of a combination function to use for performing the combination of the envelopes.

Clause 17. The method of any one of clauses 12-16, wherein transmitting the indication of the characteristic comprises transmitting an indication of a response of an amplifier used to perform the amplifying of the input signal.

Clause 18. The method of clause 17, wherein the response is a function of parameters associated with the input signal and a power supply signal of the amplifier used to amplify the input signal.

Clause 19. The method of any one of clauses 17-18, further comprising transmitting an indication of the subbands that are supported and a supported bandwidth for the input signal.

Clause 20. The method of any one of clauses 17-19, further comprising transmitting signaling to activate or deactivate operations for reducing, at the receiver device, distortion associated with the envelope tracking.

Clause 21. The method of clause 20, further comprising: receiving an indication of a capability of the receiver device, the capability being to support distortion reduction operations; and determining whether to activate or deactivate operations for reducing distortion based on the capability, wherein the signaling to activate or deactivate is based on the determination.

Clause 22. The method of any one of clauses 17-21, wherein transmitting the transmission signal includes frequency division multiplexing transmissions to multiple receiver devices, the method further comprising transmitting information associated with the frequency division multiplexing of the multiple receiver devices.

Clause 23. The method of clause 22, wherein the information includes at least one of a frequency allocation of each of the multiple receiver devices, a modulation scheme used by each of the multiple receiver devices, or reference signal information associated with each of the multiple receiver devices.

Clause 24. A method for wireless communication by a receiver device, comprising: receiving, from a transmitter device, an indication of a characteristic of an amplification system used to amplify an input signal for transmission of a transmission signal to the receiver device, wherein the amplification system implements envelope tracking using a combination of envelopes associated with subbands of the input signal; and receiving the transmission signal based on the indication of the characteristic.

Clause 25. The method of clause 24, further comprising: receiving an indication of a capability of the transmitter device, the capability being to support the envelope tracking by combining the envelopes associated with subbands; and transmitting an indication to perform the envelope tracking by combining the envelopes based on the capability.

Clause 26. The method of any one of clauses 24-25, wherein receiving the indication comprises receiving an indication of a characteristic of a filter bank used to generate signals associated with the subbands.

Clause 27. The method of any one of clauses 24-26, wherein receiving the indication comprises receiving an indication of a combination function used to combine the envelopes.

Clause 28. The method of any one of clauses 24-27, wherein receiving the indication of the characteristic comprises receiving an indication of a response of an amplifier used to amplify the input signal.

Clause 29. The method of clause 28, wherein the response is a function of parameters associated with the input signal and the combination of the envelopes.

Clause 30. The method of any one of clauses 24-29, further comprising: receiving, from the transmitter device, an indication of the subbands that are supported and a supported bandwidth for the input signal; and transmitting, to the transmitter device, a configuration associated with the transmission signal based on the indication of the subbands that are supported and the supported bandwidth for the input signal.

Clause 31. The method of any one of clauses 24-30, further comprising receiving signaling to activate or deactivate, at the receiver device, distortion reduction operations associated with the envelope tracking.

Clause 32. The method of clause 31, further comprising transmitting an indication of a capability of the receiver device, the capability being to support distortion reduction operations, wherein the signaling to activate or deactivate is based on the indication of the capability.

Clause 33. The method of any one of clauses 24-32, wherein: the transmission signal includes frequency division multiplexed signals to multiple receiver devices; the method further comprises receiving information associated with frequency division multiplexing of the multiple receiver devices; and receiving the transmission signal includes reducing distortion associated with the envelope tracking based on the information.

Clause 34. The method of clause 33, wherein the information includes at least one of a frequency allocation of each of the multiple receiver devices, a modulation scheme used by each of the multiple receiver devices, or reference signal information associated with each of the multiple receiver devices.

Clause 35. The method of any one of clauses 24-34, further comprising transmitting an indication of a combination function to use for performing the combination of the envelopes.

Clause 36: An apparatus, comprising: a memory comprising executable instructions; one or more processors configured to execute the executable instructions and cause the apparatus to perform a method in accordance with any one of Clauses 1-35.

Clause 37: An apparatus, comprising means for performing a method in accordance with any one of Clauses 1-35.

Clause 38: A non-transitory computer-readable medium comprising executable instructions that, when executed by one or more processors of an apparatus, cause the apparatus to perform a method in accordance with any one of Clauses 1-35.

Clause 39: A computer program product embodied on a computer-readable storage medium comprising code for performing a method in accordance with any one of Clauses 1-35.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of envelope tracking schemes for a node in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a receiver device, comprising:
   receiving, from a transmitter device, an indication of a characteristic of an amplification system used to amplify an input signal for transmission of a transmission signal to the receiver device,
   wherein the amplification system implements envelope tracking using a combination of envelopes extracted for respective subbands of the input signal; and
   receiving the transmission signal based on the indication of the characteristic,
   wherein the method further comprises:
   (i) receiving an indication of a capability, of the transmitter device, to support the envelope tracking by combining the envelopes associated with subbands, and transmitting an indication to perform the envelope tracking by combining the envelopes based on the capability; or
   (ii) receiving, from the transmitter device, an indication of subbands that are supported and a supported bandwidth for the input signal, and transmitting, to the transmitter device, a configuration associated with the transmission signal based on the indication of the subbands that are supported and the supported bandwidth for the input signal; or
   (iii) receiving signaling to activate or deactivate, at the receiver device, distortion reduction operations associated with the envelope tracking; or
   (iv) receiving information associated with frequency division multiplexing of multiple receiver devices, wherein the transmission signal includes frequency division multiplexed signals to the multiple receiver devices, and wherein receiving the transmission signal includes reducing distortion associated with the envelope tracking based on the information; or
   (v) transmitting an indication of a combination function to use for performing the combination of the envelopes.

2. The method of claim 1, further comprising:
receiving the indication of the capability to support the envelope tracking by combining the envelopes associated with subbands; and
transmitting the indication to perform the envelope tracking by combining the envelopes based on the capability.

3. The method of claim 1, wherein receiving the indication comprises: receiving an indication of a characteristic of a filter bank used to generate signals associated with the subbands.

4. A method for wireless communication by a receiver device, comprising:
receiving, from a transmitter device, an indication of a characteristic of an amplification system used to amplify an input signal for transmission of a transmission signal to the receiver device,
wherein the amplification system implements envelope tracking using a combination of envelopes extracted for respective subbands of the input signal; and
receiving the transmission signal based on the indication of the characteristic,
wherein receiving the indication comprises receiving an indication of a combination function used to combine the envelopes.

5. The method of claim 1, wherein receiving the indication of the characteristic comprises: receiving an indication of a response of an amplifier of the amplification system used to amplify the input signal.

6. The method of claim 5, wherein the response is a function of parameters associated with the input signal and the combination of the envelopes.

7. The method of claim 1, further comprising:
receiving, from the transmitter device, the indication of the subbands that are supported and the supported bandwidth for the input signal; and
transmitting, to the transmitter device, the configuration associated with the transmission signal based on the indication of the subbands that are supported and the supported bandwidth for the input signal.

8. The method of claim 1, further comprising receiving the signaling to activate or deactivate, at the receiver device, the distortion reduction operations associated with the envelope tracking.

9. The method of claim 8, further comprising transmitting an indication of a capability of the receiver device, the capability being to support distortion reduction operations, wherein the signaling to activate or deactivate is based on the indication of the capability.

10. The method of claim 1, wherein:
the transmission signal includes the frequency division multiplexed signals to the multiple receiver devices;
the method further comprises receiving the information associated with the frequency division multiplexing of the multiple receiver devices; and
receiving the transmission signal includes reducing the distortion associated with the envelope tracking based on the information.

11. The method of claim 10, wherein the information includes at least one of a frequency allocation of each of the multiple receiver devices, a modulation scheme used by each of the multiple receiver devices, or reference signal information associated with each of the multiple receiver devices.

12. The method of claim 1, further comprising transmitting the indication of the combination function to use for performing the combination of the envelopes.

13. An apparatus for wireless communication by a receiver device, comprising: a memory comprising executable instructions; and one or more processors configured to execute the executable instructions and cause the apparatus to:
receive, from a transmitter device, an indication of a characteristic of an amplification system used to amplify an input signal for transmission of a transmission signal to the receiver device,
wherein the amplification system implements envelope tracking using a combination of envelopes extracted for respective subbands of the input signal; and
receive the transmission signal based on the indication of the characteristic,
wherein the one or more processors are configured to execute the executable instructions and cause the apparatus to:
(i) receive an indication of a capability, of the transmitter device, to support the envelope tracking by combining the envelopes associated with subbands, and transmit an indication to perform the envelope tracking by combining the envelopes based on the capability; or
(ii) receive, from the transmitter device, an indication of subbands that are supported and a supported bandwidth for the input signal, and transmit, to the transmitter device, a configuration associated with the transmission signal based on the indication of the subbands that are supported and the supported bandwidth for the input signal; or
(iii) receive signaling to activate or deactivate, at the receiver device, distortion reduction operations associated with the envelope tracking; or
(iv) receive information associated with frequency division multiplexing of multiple receiver devices, wherein the transmission signal includes frequency division multiplexed signals to the multiple receiver devices, and wherein to receive the transmission signal, the one or more processors are configured to execute the executable instructions and cause the apparatus to reduce distortion associated with the envelope tracking based on the information; or
(v) transmit an indication of a combination function to use for performing the combination of the envelopes.

14. The apparatus of claim 13, wherein the one or more processors are configured to execute the executable instructions and further cause the apparatus to:
receive the indication of the capability to support the envelope tracking by combining the envelopes associated with subbands; and
transmit the indication to perform the envelope tracking by combining the envelopes based on the capability.

15. The apparatus of claim 13, wherein, to receive the indication, the one or more processors are configured to execute the executable instructions and cause the apparatus to receive an indication of a characteristic of a filter bank used to generate signals associated with the subbands.

16. An apparatus for wireless communication by a receiver device, comprising: a memory comprising executable instructions; and one or more processors configured to execute the executable instructions and cause the apparatus to:
receive, from a transmitter device, an indication of a characteristic of an amplification system used to amplify an input signal for transmission of a transmission signal to the receiver device, wherein the amplification system implements envelope tracking using a combination of envelopes extracted for respective subbands of the input signal; and receive the transmission signal based on the indication of the characteristic, wherein, to receive the indication, the one or more processors are configured to execute the executable instructions and cause the apparatus to receive an indication of a combination function used to combine the envelopes.

17. The apparatus of claim 13, wherein, to receive the indication of the characteristic, the one or more processors are configured to execute the executable instructions and cause the apparatus to receive the indication comprises: receiving an indication of a response of an amplifier of the amplification system used to amplify the input signal.

18. The apparatus of claim 17, wherein the response is a function of parameters associated with the input signal and the combination of the envelopes.

19. The apparatus of claim 13, wherein the one or more processors are configured to execute the executable instructions and further cause the apparatus to:

receive, from the transmitter device, the indication of the subbands that are supported and the supported bandwidth for the input signal; and transmit, to the transmitter device, the configuration associated with the transmission signal based on the indication of the subbands that are supported and the supported bandwidth for the input signal.

20. The apparatus of claim 13, wherein the one or more processors are configured to execute the executable instructions and further cause the apparatus to receive the signaling to activate or deactivate, at the receiver device, the distortion reduction operations associated with the envelope tracking.

21. The apparatus of claim 20, wherein the one or more processors are configured to execute the executable instructions and further cause the apparatus to transmit an indication of a capability of the receiver device, the capability being to support distortion reduction operations, wherein the signaling to activate or deactivate is based on the indication of the capability.

22. The apparatus of claim 13, wherein:

the transmission signal includes the frequency division multiplexed signals to the multiple receiver devices;

the one or more processors are configured to execute the executable instructions and further cause the apparatus to receive the information associated with the frequency division multiplexing of the multiple receiver devices; and to receive the transmission signal, the one or more processors are configured to execute the executable instructions and cause the apparatus to reduce the distortion associated with the envelope tracking based on the information.

23. The apparatus of claim 22, wherein the information includes at least one of a frequency allocation of each of the multiple receiver devices, a modulation scheme used by each of the multiple receiver devices, or reference signal information associated with each of the multiple receiver devices.

24. The apparatus of claim 13, wherein the one or more processors are configured to execute the executable instructions and further cause the apparatus to transmit the indication of the combination function to use for performing the combination of the envelopes.

* * * * *